(12) United States Patent
Kimes

(10) Patent No.: US 8,888,637 B2
(45) Date of Patent: Nov. 18, 2014

(54) VEHICLE DRIVE SYSTEM INCLUDING A TRANSMISSION

(75) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 444 days.

(21) Appl. No.: 13/218,817

(22) Filed: Aug. 26, 2011

(65) Prior Publication Data
US 2012/0149518 A1 Jun. 14, 2012

Related U.S. Application Data

(63) Continuation-in-part of application No. PCT/US2011/036636, filed on May 16, 2011.

(60) Provisional application No. 61/421,868, filed on Dec. 10, 2010.

(51) Int. Cl.
*F16H 3/72* (2006.01)
*F16H 37/08* (2006.01)

(52) U.S. Cl.
CPC ........ *F16H 3/728* (2013.01); *F16H 2037/0886* (2013.01); *F16H 2200/0039* (2013.01); *F16H 2200/0043* (2013.01); *F16H 2200/2023* (2013.01); *F16H 2200/2087* (2013.01)
USPC .......................................................... 475/5

(58) Field of Classification Search
None
See application file for complete search history.

(56) References Cited

U.S. PATENT DOCUMENTS

| | | | |
|---|---|---|---|
| 2,960,287 A | 11/1960 | Barlow | |
| 3,130,989 A | 4/1964 | Lannen | |
| 4,050,560 A | 9/1977 | Torstenfelt | |
| 4,340,133 A | 7/1982 | Blersch | |
| 5,052,534 A | 10/1991 | Gustin et al. | |
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,638,929 A | 6/1997 | Park | |

(Continued)

FOREIGN PATENT DOCUMENTS

GB      1007475 A      10/1965

OTHER PUBLICATIONS

International Search Report and Written Opinion; International Application No. PCT/US12/050742; date of mailing Nov. 20, 2012.

(Continued)

*Primary Examiner* — Robert A Siconolfi
*Assistant Examiner* — Huan Le
(74) *Attorney, Agent, or Firm* — Brooks Kushman P.C.

(57) ABSTRACT

A vehicle drive system including a transmission is provided. The system includes a compound planetary gear set including first, second, third and fourth elements. The second element connects with an output shaft of the transmission. The system further includes a transmission housing. The system still further includes an electric motor which has an output shaft connecting with the first and fourth elements for driving the first and fourth elements in response to an electrical signal to obtain a desired transmission ratio. The system further includes a non-friction controllable clutch assembly which is non-hydraulically controlled to change between a coupling state for coupling the fourth element to the motor output shaft and an uncoupling state for uncoupling the fourth element from the motor output shaft.

54 Claims, 10 Drawing Sheets

(56) References Cited

U.S. PATENT DOCUMENTS

| | | | |
|---|---|---|---|
| 5,642,009 | A | 6/1997 | McCleer et al. |
| 5,678,668 | A | 10/1997 | Sink |
| 5,847,469 | A | 12/1998 | Tabata et al. |
| 5,856,709 | A | 1/1999 | Ibaraki et al. |
| 5,918,715 | A | 7/1999 | Ruth et al. |
| 5,927,455 | A | 7/1999 | Baker et al. |
| 6,019,699 | A | 2/2000 | Hoshiya et al. |
| 6,065,576 | A | 5/2000 | Shaw et al. |
| 6,075,302 | A | 6/2000 | McCleer |
| 6,193,038 | B1 | 2/2001 | Scott et al. |
| 6,237,931 | B1 | 5/2001 | Marola |
| 6,244,965 | B1 | 6/2001 | Klecker et al. |
| 6,290,044 | B1 | 9/2001 | Burgman et al. |
| 6,306,057 | B1 | 10/2001 | Morisawa et al. |
| 6,344,008 | B1 | 2/2002 | Nagano et al. |
| 6,503,167 | B1 | 1/2003 | Sturm |
| 6,814,201 | B2 | 11/2004 | Thomas |
| 6,846,257 | B2 | 1/2005 | Baker et al. |
| 6,953,409 | B2 | 10/2005 | Schmidt et al. |
| 6,982,502 | B1 | 1/2006 | Sendaula et al. |
| 7,093,512 | B2 | 8/2006 | Ibamoto et al. |
| 7,153,228 | B2 | 12/2006 | Fujiu et al. |
| 7,198,587 | B2 | 4/2007 | Samie et al. |
| 7,201,690 | B2 | 4/2007 | Miura et al. |
| 7,223,198 | B2 | 5/2007 | Kimes et al. |
| 7,223,200 | B2 | 5/2007 | Kojima et al. |
| 7,255,186 | B2 * | 8/2007 | Wakuta et al. ............ 180/65.21 |
| 7,256,510 | B2 | 8/2007 | Holmes et al. |
| 7,258,214 | B2 | 8/2007 | Pawley et al. |
| 7,275,628 | B2 | 10/2007 | Pawley et al. |
| 7,288,041 | B2 * | 10/2007 | Bucknor et al. ............ 475/151 |
| 7,344,010 | B2 | 3/2008 | Fetting, Jr. et al. |
| 7,349,010 | B2 | 3/2008 | Bryant et al. |
| 7,393,296 | B2 | 7/2008 | Kano et al. |
| 7,396,305 | B2 * | 7/2008 | Raghavan et al. ............ 475/5 |
| 7,397,296 | B1 | 7/2008 | Kiani |
| 7,426,971 | B2 | 9/2008 | Kano et al. |
| 7,464,801 | B2 | 12/2008 | Wittkopp |
| 7,484,605 | B2 | 2/2009 | Pawley et al. |
| 7,491,151 | B2 | 2/2009 | Maguire et al. |
| 7,507,174 | B2 * | 3/2009 | Raghavan et al. ............ 475/5 |
| 7,614,466 | B2 | 11/2009 | Kano et al. |
| 7,621,359 | B2 | 11/2009 | Kano et al. |
| 7,690,455 | B2 | 4/2010 | Kano et al. |
| 7,695,387 | B2 * | 4/2010 | Oba ............ 475/5 |
| 7,806,795 | B2 * | 10/2010 | Oba et al. ............ 475/5 |
| 7,942,781 | B2 | 5/2011 | Kimes |
| 8,465,386 | B2 * | 6/2013 | Kersting ............ 475/5 |
| 2004/0159517 | A1 | 8/2004 | Thomas |
| 2006/0138777 | A1 | 6/2006 | Hofbauer et al. |
| 2006/0185957 | A1 | 8/2006 | Kimes et al. |
| 2007/0056825 | A1 | 3/2007 | Fetting, Jr. et al. |
| 2007/0107960 | A1 | 5/2007 | Takami et al. |
| 2007/0278061 | A1 | 12/2007 | Wittkopp et al. |
| 2008/0093190 | A1 | 4/2008 | Belmont |
| 2008/0110715 | A1 | 5/2008 | Pawley |
| 2008/0169165 | A1 | 7/2008 | Samie et al. |
| 2008/0169166 | A1 | 7/2008 | Wittkopp et al. |
| 2008/0185253 | A1 | 8/2008 | Kimes |
| 2008/0223681 | A1 | 9/2008 | Stevenson et al. |
| 2008/0245360 | A1 | 10/2008 | Almy et al. |
| 2009/0084653 | A1 | 4/2009 | Holmes |
| 2009/0098968 | A1 | 4/2009 | Maguire et al. |
| 2009/0098970 | A1 | 4/2009 | Kimes |
| 2009/0127059 | A1 | 5/2009 | Knoblauch |
| 2009/0133981 | A1 | 5/2009 | Tarasinski et al. |
| 2009/0142207 | A1 | 6/2009 | Ring et al. |
| 2009/0159391 | A1 | 6/2009 | Eisengruber |
| 2009/0194381 | A1 | 8/2009 | Samie et al. |
| 2009/0211863 | A1 | 8/2009 | Kimes |
| 2009/0255773 | A1 | 10/2009 | Seufert et al. |
| 2010/0044141 | A1 | 2/2010 | Kimes et al. |
| 2010/0071497 | A1 | 3/2010 | Reisch et al. |
| 2010/0122883 | A1 * | 5/2010 | Bartos et al. ............ 192/43.1 |
| 2010/0200358 | A1 | 8/2010 | Eisengruber et al. |
| 2010/0230226 | A1 | 9/2010 | Prout |
| 2010/0252384 | A1 | 10/2010 | Eisengruber |

OTHER PUBLICATIONS

International Search Report and Written Opinion, International Application No. PCT/US2011/036636; mailed Aug. 26, 2011.

International Search Report and Written Opinion, International Application No. PCT/US2011/036634; mailed Aug. 25, 2011.

International Search Report and Written Opinion; International application No. PCT/US12/50749; date of mailing Dec. 11, 2012.

International Report on Patentability; International application No. PCT/US2011/036636; date of issuance of report Jun. 12, 2013.

International Preliminary Report on Patentability; International application No. PCT/US2012/050753; date of issuance of report Mar. 25, 2014.

Notice of Allowance and Fee(s) Due; corresponding U.S. Appl. No. 13/370,506; date of mailing Apr. 28, 2014.

International Preliminary Report on Patentability; International application No. PCT/US2012/050749; date of issuance of report Mar. 4, 2014.

International Preliminary Report on Patentability; International application No. PCT/US2012/050742; date of issuance of report Mar. 4, 2014.

Office Action; U.S. Appl. No. 13/370,507; date of mailing Aug. 27, 2014.

* cited by examiner

VEHICLE DRIVE SYSTEM INCLUDING A TRANSMISSION

CROSS-REFERENCE TO RELATED APPLICATIONS

This application is a continuation-in-part of U.S. national phase of PCT Appln. No. PCT/US11/36636 filed May 16, 2011 which claims the benefit of U.S. provisional patent application No. 61/421,868 filed Dec. 10, 2010, the disclosures of which are incorporated in their entirety by reference herein.

TECHNICAL FIELD

This invention relates to vehicle power trains or drive systems including controllable or selectable overrunning coupling assemblies and methods and systems for controlling such drive systems and, in particular, to drive systems that have at least one electrical power plant and controllable one-way clutches (OWCs) including at least one dynamic type OWC.

Overview

Automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable shift feel. Also the vehicle has no acceleration during this transition leading to undesirable driving situations (pulling out into traffic, merging, etc.).

Today's step ratio automatic transmissions use hydraulics to power the ratio change, dampen NVH (i.e., noise, vibration and harshness), power coupling/decoupling, and providing lubrication and cooling. This is achieved with the use of a torque converter (for coupling/decoupling power, multiplying torque, and NVH dampening), an oil pump, valve body (or hydraulic logic), and friction-type clutches (bands and frictions which are activated by hydraulics to selectively lock and release components).

Multi-Plate Friction-Type Clutches and Brakes

Clutches and brakes are used to drive or hold members of a planetary gear set, respectively. As a general rule, multi-plate clutches connect one planetary member to another. Multi-plate brakes connect a planetary member to the transmission case to hold it stationary.

The clutches and brakes consist of a number of friction discs and steel discs. The friction discs are coated with a friction material and have engaging lugs (splines) on the inner perimeter. The steel discs are steel on both sides and have engaging lugs located on the outer perimeter. The engaging lugs on the friction discs are usually engaged with a planetary member. The engaging lugs on the steel discs are usually engaged with the clutch piston housing.

In addition to the friction and steel discs, there is also an apply piston, housing and return spring. Once hydraulic fluid is applied to the clutch assembly, the piston advances and the friction and steel discs will be locked together. Once the hydraulic pressure is released, the return spring will cause the piston to return to its rest position and the friction and steel discs will be unlocked.

A band-type brake is used for some applications. The brake band is a circular band with friction material bonded to the inner surface. The band wraps around a particular planetary component (clutch drum) and locks that component to the transmission case. The brake band is applied and released by the clutch apply piston.

In order to carry out a shift in ratio, fluid needs to be applied or released from the multi-plate clutch (or brake). The following method occurs:

1. Fluid from a shift valve in the valve body is applied to the clutch assembly.
2. Fluid pressure builds behind the apply piston and overcomes the resistance from diaphragm spring.
3. The friction and steel discs are compressed together and become locked, preventing any slippage between them.
4. Two planetary members are now locked together.
5. When fluid pressure is released, the steel and friction discs are allowed to unlock.

This method has had some advantages. The power density is very high using hydraulics to clamp clutches and to multiply torque. Hydraulic systems have proven to have good dampening characteristics and smooth shift capability. It is also a natural way to lubricate the components in the transmission and to carry away heat from torque converters, pumps, gear sets, bearings, etc.

However, there are a few disadvantages. The first is efficiency. The pump is always on and pumping oil whenever the engine is running. When a friction element is turned on, power is used to maintain the clamping pressure of that friction element.

The slipping of the torque converter is also a significant source of parasitic loss and the open friction elements in the transmission provide drag and thus parasitic losses also. Another disadvantage is the complexity of these components. Clutches, pumps, torque converters, and valve bodies are among the most likely components within a transmission to have issues and thus drive warranty cost and negatively impact upon customer satisfaction. These components also tend to be the most expensive components in the transmission.

A one-way clutch (i.e., OWC) produces a drive connection (locked state) between rotating components when their relative rotation is in one direction, and overruns (freewheel state) when relative rotation is in the opposite direction. A typical one-way clutch consists of an inner ring, an outer ring and a locking device between the two rings. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to prevent engine braking during coasting. Also there is a one-way clutch in the stator of the torque converter.

A controllable OWC is an OWC where the lock action can be turned "off" such that it freewheels in both directions, and/or the lock action can be turned "on" such that it locks in one or both directions.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2010/0252384; 2009/0133981; 2009/0127059; 2009/0084653; 2009/0194381; 2009/0142207; 2009/0255773; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0138777; 2006/0185957; and the following U.S. Pat. Nos. 7,942,781; 7,806,795; 7,491,151; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 5,638,929; 5,362,293; 5,678,668; 5,052,534; 5,387,854; 5,231,265; 5,394,321; 5,206,573; 5,453,598; 5,642,009; 6,075,302; 6,982,502; 7,153,228; and 5,918,715.

U.S. patents assigned to Toyota and which describe hybrid transmissions or power trains include: U.S. Pat. Nos. 5,847,469; 5,856,709; 6,019,699; 6,306,057; 6,344,008; 7,201,690; 7,223,200; 7,255,186; 7,393,296; 7,397,296; 7,426,971; 7,614,466; 7,621,359; and 7,690,455.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

In one embodiment, a vehicle drive system including a transmission is provided. The system includes a compound planetary gear set including first, second, third and fourth elements. The second element connects with an output shaft of the transmission. The system further includes a transmission housing. The system still further includes an electric motor which has an output shaft connecting with the first and fourth elements for driving the first and fourth elements in response to an electrical signal to obtain a desired transmission ratio. The system further includes a non-friction controllable clutch assembly which is non-hydraulically controlled to change between a coupling state for coupling the fourth element to the motor output shaft and an uncoupling state for uncoupling the fourth element from the motor output shaft.

The system may include a non-friction controllable brake assembly which may have a coupling state for coupling the fourth element to the housing and an uncoupling state for uncoupling the fourth element from the housing. The brake assembly may be non-hydraulically controlled to change state to maintain the desired transmission ratio.

The system may include a non-friction controllable brake assembly which may have a coupling state for coupling the third element to the housing and an uncoupling state for uncoupling the third element from the housing. The brake assembly may be non-hydraulically controlled to change state to maintain the desired transmission ratio.

The system may include non-friction controllable first and second brake assemblies. The first brake assembly may have a coupling state for coupling the fourth element to the housing and an uncoupling state for uncoupling the fourth element from the housing. The second brake assembly may have a coupling state for coupling the third element to the housing and an uncoupling state for uncoupling the third element from the housing. The first and second brake assemblies may be non-hydraulically controlled to change state to maintain the desired transmission ratio.

The first, second, third and fourth elements may include a first sun gear, a ring gear, a carrier and a second sun gear, respectively.

The system may include a non-friction clutch assembly which may be non-hydraulically controlled to change between a coupling state for coupling the first element to the motor output shaft and an uncoupling state for uncoupling the first element from the motor output shaft.

The third element may be connecting with an output shaft of a power plant and the system may further include a non-friction clutch assembly which may be non-hydraulically controlled to change between a coupling state for coupling the third element to the power plant output shaft and an uncoupling state for uncoupling the third element from the power plant output shaft.

The system may include a power plant which may have an output shaft. The system may further include a non-friction clutch assembly which may be non-hydraulically controlled to change between a coupling state for coupling the power plant output shaft to an output shaft of an engine and an uncoupling state for uncoupling the power plant output shaft from the engine output shaft.

The electric motor may be utilized for regenerative braking in response to a control signal.

The clutch assembly may include an overrunning coupling assembly which allows the fourth element to free-wheel relative to the motor output shaft in the uncoupling state.

The clutch assembly may include a first member coupled to the fourth element, a second member coupled to the motor output shaft and at least one ratcheting member for selectively coupling the first and second members together in the coupling state.

The system may include an electromechanical apparatus to control the state of the clutch assembly in response to an electrical power signal.

The electromechanical apparatus may include a latching solenoid.

The electric motor may be mounted within the housing.

The system may include a plurality of non-friction, non-hydraulically controlled coupling assemblies including the clutch assembly.

The plurality of non-friction coupling assemblies may include at least one one-way brake assembly.

The transmission may be an automatic transmission.

The transmission may be a multi-speed, step ratio transmission for automotive vehicles.

In another embodiment, a vehicle drive system includes a three-speed transmission. The system includes a compound planetary gear set including first, second, third and fourth elements. The second element connects with an output shaft of the transmission. The system further includes a transmission housing. The system still further includes an electric motor which has an output shaft connecting with the first and fourth elements for driving the first and fourth elements in response to an electrical signal to obtain a desired transmission ratio. The system further includes non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain the desired transmission ratio. A non-friction clutch assembly is non-hydraulically controlled to change between a coupling state for coupling the fourth element to the motor output shaft and an uncoupling state for uncoupling the fourth element from the motor output shaft.

The first, second, third and fourth elements may include a first sun gear, a ring gear, a carrier and a second sun gear, respectively.

The electric motor may be utilized for regenerative braking in response to a control signal.

The clutch assembly may include an overrunning coupling assembly which allows the fourth element to free-wheel relative to the motor output shaft in the uncoupling state.

The clutch assembly may include a first member coupled to the fourth element, a second member coupled to the motor output shaft and at least one ratcheting member for selectively coupling the first and second members together in the coupling state.

The system may further include electromechanical apparatus to control the state of the clutch assembly in response to an electrical power signal.

The electromechanical apparatus may include a latching solenoid.

The electric motor may be mounted on the housing.

The transmission may be an automatic transmission.

The transmission may be a multi-speed, step ratio transmission for automotive vehicles.

In yet another embodiment, a vehicle drive system includes a multi-speed transmission. The system includes a compound planetary gear set including first, second, third and fourth elements. The second element connects with an output shaft of the transmission and the third element connects with an output shaft of a power plant. The system further includes a transmission housing. The system still further includes an electric motor which has an output shaft connecting with the first and fourth elements for driving the first and fourth elements in response to an electrical signal to obtain a desired transmission ratio. The system further includes non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain the desired transmission ratio. The system still further includes a non-friction first clutch assembly which is non-hydraulically controlled to change between a coupling state for coupling the fourth element to the motor output shaft and an uncoupling state for uncoupling the fourth element from the motor output shaft. The system further includes a non-friction second clutch assembly which is non-hydraulically controlled to change between a coupling state for coupling the first element to the motor output shaft and an uncoupling state for uncoupling the first element from the motor output shaft. The system still further includes a non-friction third clutch assembly which is non-hydraulically controlled to change between a coupling state for coupling the third element to the power plant output shaft and an uncoupling state for uncoupling the third element from the power plant output shaft.

The first, second, third and fourth elements may comprise a first sun gear, a ring gear, a carrier and a second sun gear, respectively.

The electric motor may be utilized for regenerative braking in response to a control signal.

In still yet another embodiment, a vehicle drive system includes a multi-speed transmission. The system includes a power plant which has an output shaft. The system further includes a compound planetary gear set including first, second, third and fourth elements, the second element connecting with an output shaft of the transmission and the third element connecting with the power plant output shaft. The system still further includes a transmission housing. The system further includes an electric motor which has an output shaft connecting with the first and fourth elements for driving the first and fourth elements in response to an electrical signal to obtain a desired transmission ratio. The system still further includes non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain the desired transmission ratio. The system further includes a non-friction first clutch assembly which is non-hydraulically controlled to change between a coupling state for coupling the fourth element to the motor output shaft and an uncoupling state for uncoupling the fourth element from the motor output shaft. The system still further includes a non-friction second clutch assembly which is non-hydraulically controlled to change between a coupling state for coupling the first element to the motor output shaft and an uncoupling state for uncoupling the first element from the motor output shaft. The system further includes a non-friction third clutch assembly which is non-hydraulically controlled to change between a coupling state for coupling the third element to the power plant output shaft and an uncoupling state for uncoupling the third element from the power plant output shaft. The system still further includes a non-friction fourth clutch assembly which is non-hydraulically controlled to change between a coupling state for coupling the power plant output shaft to an engine output shaft and an uncoupling state for uncoupling the power plant output shaft from the engine output shaft.

The first, second, third and fourth elements may include a first sun gear, a ring gear, a carrier and a second sun gear, respectively.

The electric motor may be utilized for regenerative braking in response to a control signal.

The electric motor and the power plant may be mounted within the housing.

In yet another embodiment, a vehicle drive system including a transmission is provided. The system includes a compound planetary gear set including first, second, third and fourth elements. The second element connects with an output shaft of the transmission. The third element connects with an engine output shaft. The system further includes a transmission housing. The system still further includes an electric motor which has an output shaft connecting with the first and fourth elements for driving the first and fourth elements in response to a first electrical signal. The system still further includes a non-friction controllable first clutch assembly which is non-hydraulically controlled to change between a coupling state for coupling the fourth element to the motor output shaft and an uncoupling state for uncoupling the fourth element from the motor output shaft. The system further includes a power plant which has an output shaft connecting with the fourth element for driving the fourth element in response to a second electrical signal. The system still further includes a non-friction controllable second clutch assembly which is non-hydraulically controlled to change between a coupling state for coupling the fourth element to the power plant output shaft and an uncoupling state for uncoupling the fourth element from the power plant output shaft.

The system may include a non-friction controllable brake assembly which may have a coupling state for coupling the fourth element to the housing and an uncoupling state for uncoupling the fourth element from the housing. The brake assembly may be non-hydraulically controlled to change state to maintain the desired transmission ratio.

The system may include a non-friction controllable brake assembly which may have a coupling state for coupling the third element to the housing and an uncoupling state for uncoupling the third element from the housing. The brake assembly may be non-hydraulically controlled to change state to maintain the desired transmission ratio.

The system may include non-friction controllable first and second brake assemblies. The first brake assembly may have a coupling state for coupling the fourth element to the housing and an uncoupling state for uncoupling the fourth element from the housing. The second brake assembly may have a coupling state for coupling the third element to the housing and an uncoupling state for uncoupling the third element from the housing. The first and second brake assemblies may be non-hydraulically controlled to change state to maintain the desired transmission ratio.

The first, second, third and fourth elements may include a first sun gear, a ring gear, a carrier and a second sun gear, respectively.

The system may include a non-friction controllable third clutch assembly which may be non-hydraulically controlled to change between a coupling state for coupling the first element to the motor output shaft and an uncoupling state for uncoupling the first element from the motor output shaft.

The second clutch assembly may include an overrunning coupling assembly which allows the fourth element to freewheel relative to the power plant output shaft in the uncoupling state.

The second clutch assembly may include a first member coupled to the fourth element a second member coupled to the power plant output shaft and at least one ratcheting member for selectively coupling the first and second members together in the coupling state.

The system may include an electromechanical apparatus to control the state of the second clutch assembly in response to an electrical power signal.

The electromechanical apparatus may include a latching solenoid.

The electric motor and the power plant may be mounted within the housing.

The system may include a plurality of non-friction, non-hydraulically controlled coupling assemblies including the second clutch assembly.

The plurality of non-friction coupling assemblies may include at least one one-way brake assembly.

The transmission may be an automatic transmission.

The transmission may be a multi-speed, step ratio transmission for automotive vehicles.

In still yet another embodiment, a vehicle drive system including a multi-speed transmission is provided. The system includes a compound planetary gear set including first, second, third and fourth elements, the second element connecting with an output shaft of the transmission and the fourth element connecting with an output shaft of a power plant. The system further includes a transmission housing. The system still further includes an electric motor which has an output shaft connecting with the first and fourth elements for driving the first and fourth elements in response to an electrical signal to obtain a desired transmission ratio. The system further includes non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain the desired transmission ratio. The system still further includes a non-friction first clutch assembly which is non-hydraulically controlled to change between a coupling state for coupling the fourth element to the motor output shaft and an uncoupling state for uncoupling the fourth element from the motor output shaft. The system further includes a non-friction second clutch assembly which is non-hydraulically controlled to change between a coupling state for coupling the first element to the motor output shaft and an uncoupling state for uncoupling the first element from the motor output shaft. The system still further includes a non-friction third clutch assembly which is non-hydraulically controlled to change between a coupling state for coupling the fourth element to the power plant output shaft and an uncoupling state for uncoupling the fourth element from the power plant output shaft.

The first, second, third and fourth elements may include a first sun gear, a ring gear, a carrier and a second sun gear, respectively.

In yet another embodiment, a vehicle drive system including a multi-speed transmission is provided. The system includes a power plant having an output shaft. The system further includes a compound planetary gear set including first, second, third and fourth elements, the second element connecting with an output shaft of the transmission and the fourth element connecting with the power plant output shaft. The system still further includes a transmission housing. The system further includes an electric motor which has an output shaft connecting with the first and fourth elements for driving the first and fourth elements in response to an electrical signal. The system still further includes non-friction controllable first and second brake assemblies. The first brake assembly has a coupling state for coupling the fourth element to the housing and an uncoupling state for uncoupling the fourth element from the housing. The second brake assembly has a coupling state for coupling the third element to the housing and an uncoupling state for uncoupling the third element from the housing. The first and second brake assemblies are non-hydraulically controlled to change state to maintain the desired transmission ratio. The system further includes a non-friction first clutch assembly which is non-hydraulically controlled to change between a coupling state for coupling the fourth element to the motor output shaft and an uncoupling state for uncoupling the fourth element from the motor output shaft. The system still further includes a non-friction second clutch assembly which is non-hydraulically controlled to change between a coupling state for coupling the first element to the motor output shaft and an uncoupling state for uncoupling the first element from the motor output shaft. The system further includes a non-friction third clutch assembly which is non-hydraulically controlled to change between a coupling state for coupling the fourth element to the power plant output shaft and an uncoupling state for uncoupling the fourth element from the power plant output shaft. The system still further includes a non-friction fourth clutch assembly which is non-hydraulically controlled to change between a coupling state for coupling the third element to an engine output shaft and an uncoupling state for uncoupling the third element from the engine output shaft.

The first, second, third and fourth elements may include a first sun gear, a ring gear, a carrier and a second sun gear, respectively.

The electric motor and the power plant may be are mounted within the housing.

The power plant may include an electric motor.

DESCRIPTION OF EXAMPLE EMBODIMENTS

Figure 1:
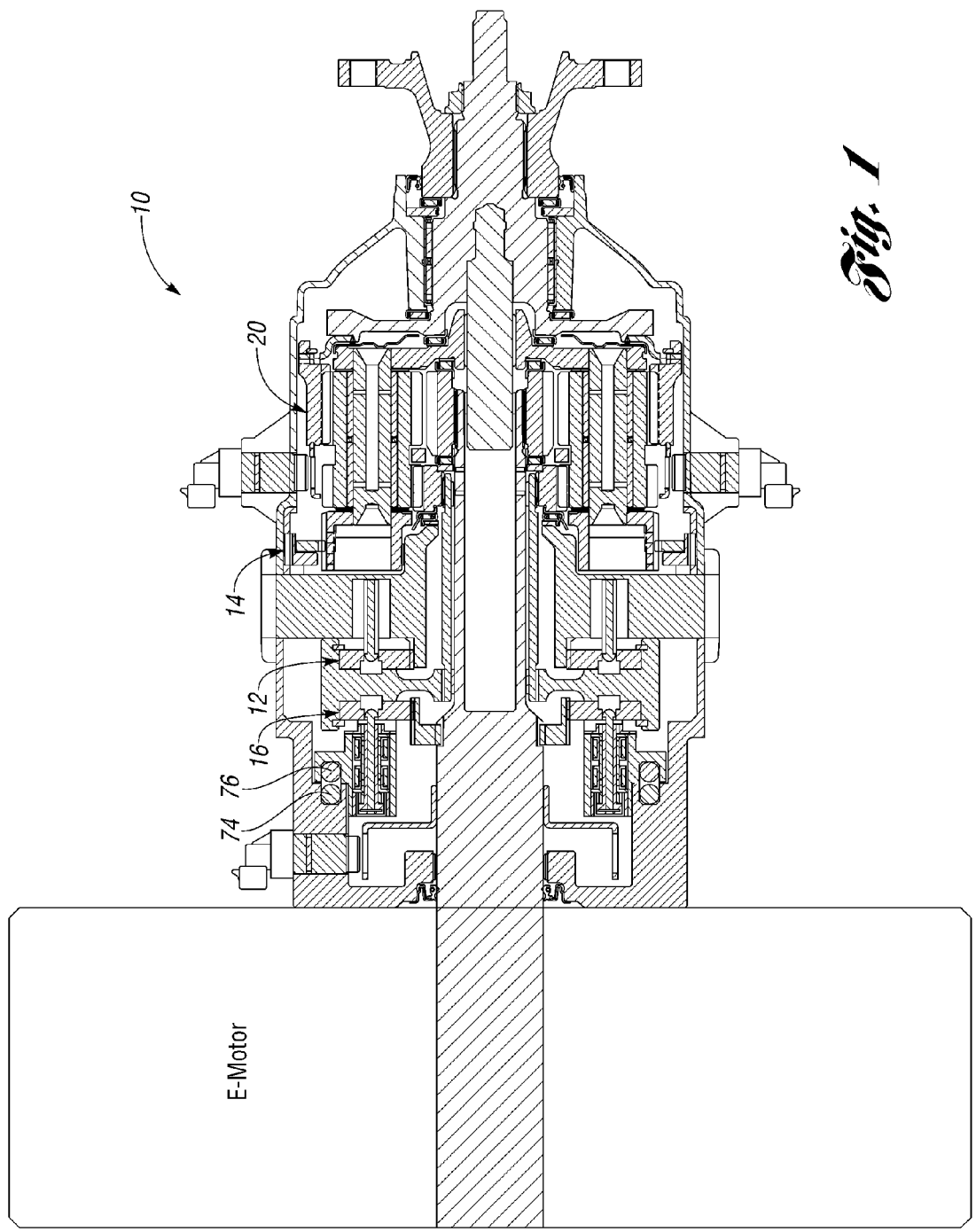
FIG. 1 is a side view, partially broken away and in cross section, of a vehicular drive system including a 3-speed transmission constructed in accordance with at least one embodiment of the present invention.

FIG. 1 is a side view, partially broken away and in cross section, of a vehicular 3-speed transmission, generally indicated at 10, constructed in accordance with at least one embodiment of the present invention and with a prior art gear set. The transmission 10 includes a pair of static, controllable two-way clutches 12 and 14, and a dynamic controllable two-way clutch, generally indicated at 16. The clutches 12 and 14 can be conventional two-way clutches generally available from Means Industries of Saginaw, Mich. As described below the clutches 12, 14, and 16 provide engine/rengen braking in gear states 1-3. The clutch 16 (as well as the clutch 26 of FIG. 4) is preferably generally of the type shown in U.S. Patent Publication 2010/0252384. A different embodiment of the clutch is generally included at 16' in FIG. 5. An E-Motor provides the power at its output shaft.

Figure 2:
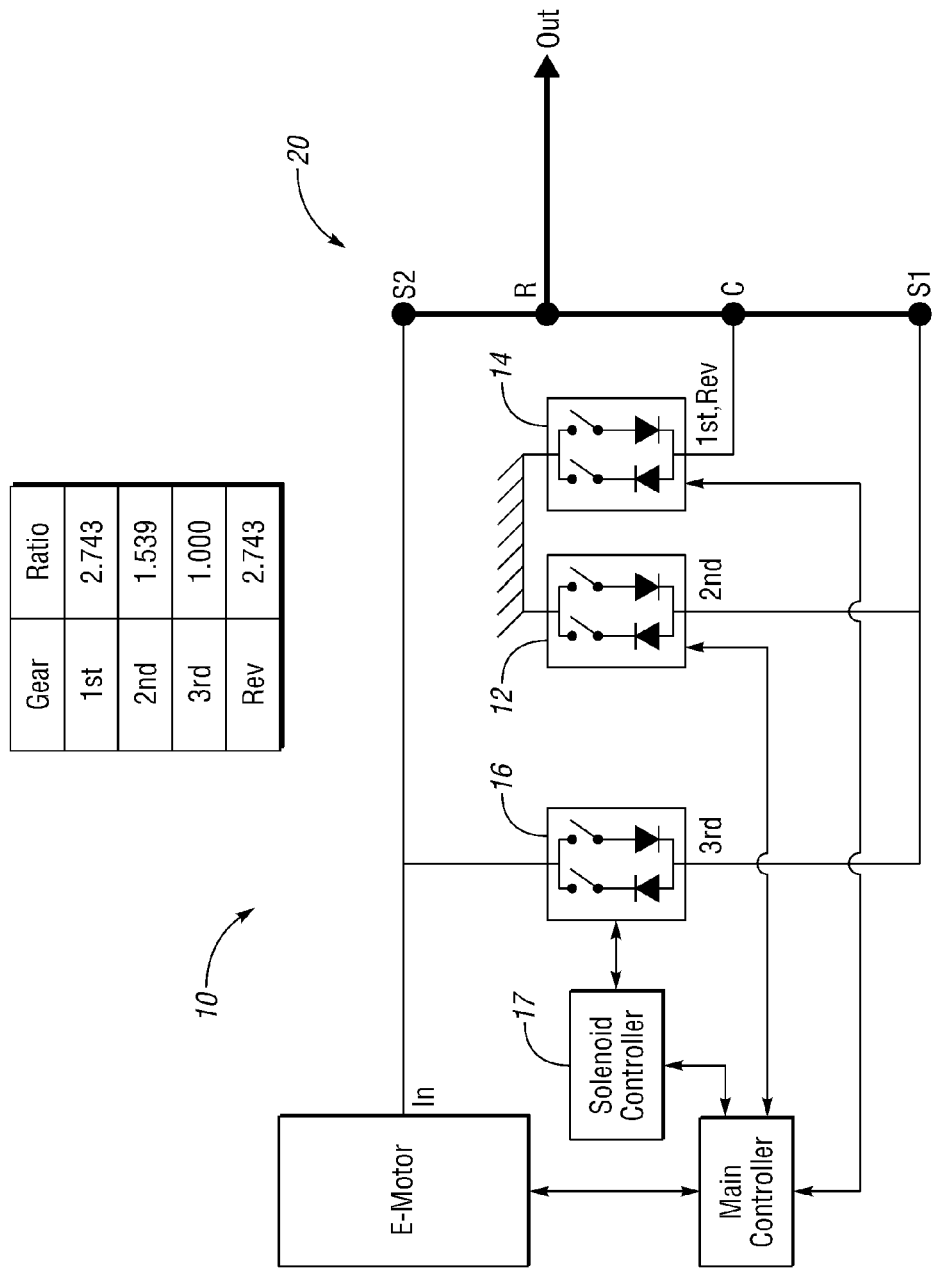
FIG. 2 includes a lever diagram and a corresponding gear/ratio table which corresponds to the drive system and transmission of FIG. 1.

FIG. 2 includes a lever diagram and a corresponding gear/ratio table which corresponds to the transmission 10 of FIG. 1. The transmission 10 includes the main electric drive motor (E-Motor) and the controllable or selectable one-way clutches 12, 14 and 16. The clutches 12 and 14 are brake clutches since one of the coupling members of each of the clutches 12 and 14 is fixed to the transmission housing so as not to rotate. The clutch 16 is a dynamic clutch wherein both of its coupling members are free to rotate relative to each other.

A main controller typically includes motor and engine (i.e., IC Engine or gas motor) controls or control logic which, in turn, performs a number of control functions including a transmission control algorithm. The main controller directly controls the brake clutches 12 and 14 as well as a solenoid controller 17 which is "onboard" the clutch 16. Each coupling assembly 12 and 14 changes between its locked mode and its overrun mode in response to a control signal directly from the main controller. The solenoid controller 17 controls the coupling assembly 16 in response to a control signal from the main controller. Control algorithms for the clutches 12, 14 and 16 are portions of the overall transmission control algorithm.

The transmission 10 includes a double planetary gear set, generally indicated at 20, comprising four members of the Ravigneaux type. The gear set 20 includes a basic gear set whose planet carrier carries a first set of planet pinions meshing with a second set of planet pinions (collectively, C) a first sun gear, S1, a second sun gear, S2, and a ring gear, R. Gear S1 may have 38 teeth, S2 may have 31 teeth and R may have 85 teeth.

The four torque transmitting members C, S1, S2 and R are associated with the control clutch 16, the brake clutches 12 and 14 and an output shaft. The second sun gear, S2, is driven by the E-Motor. The ring gear, R, is fixed for rotation with the output shaft. The member, C, is associated with the brake clutch 14. The fourth member, S1, is associated with the brake clutch 12 and the dynamic clutch 16. The transmission is "EV mode only" for gear states 1 thru 3.

In first gear, the E-Motor drives the member, S2, according to the low reduction ratio of the gear set 20 with the brake clutch 14 engaged thereby holding member C against rotation.

In second gear, the E-Motor drives the member, S2, according to the intermediate reduction ratio of the gear set 20 with the brake clutch 12 engaged thereby holding member S1 against rotation.

In third gear, the E-Motor drives the member, S2, according to the first gear ratio with the clutch 16 engaged thereby driving members S1 and S2 as a unit.

In reverse drive, the clutch 14 is engaged. S2 is driven backwards by the E-Motor thus driving the ring gear output backwards.

Figure 3:
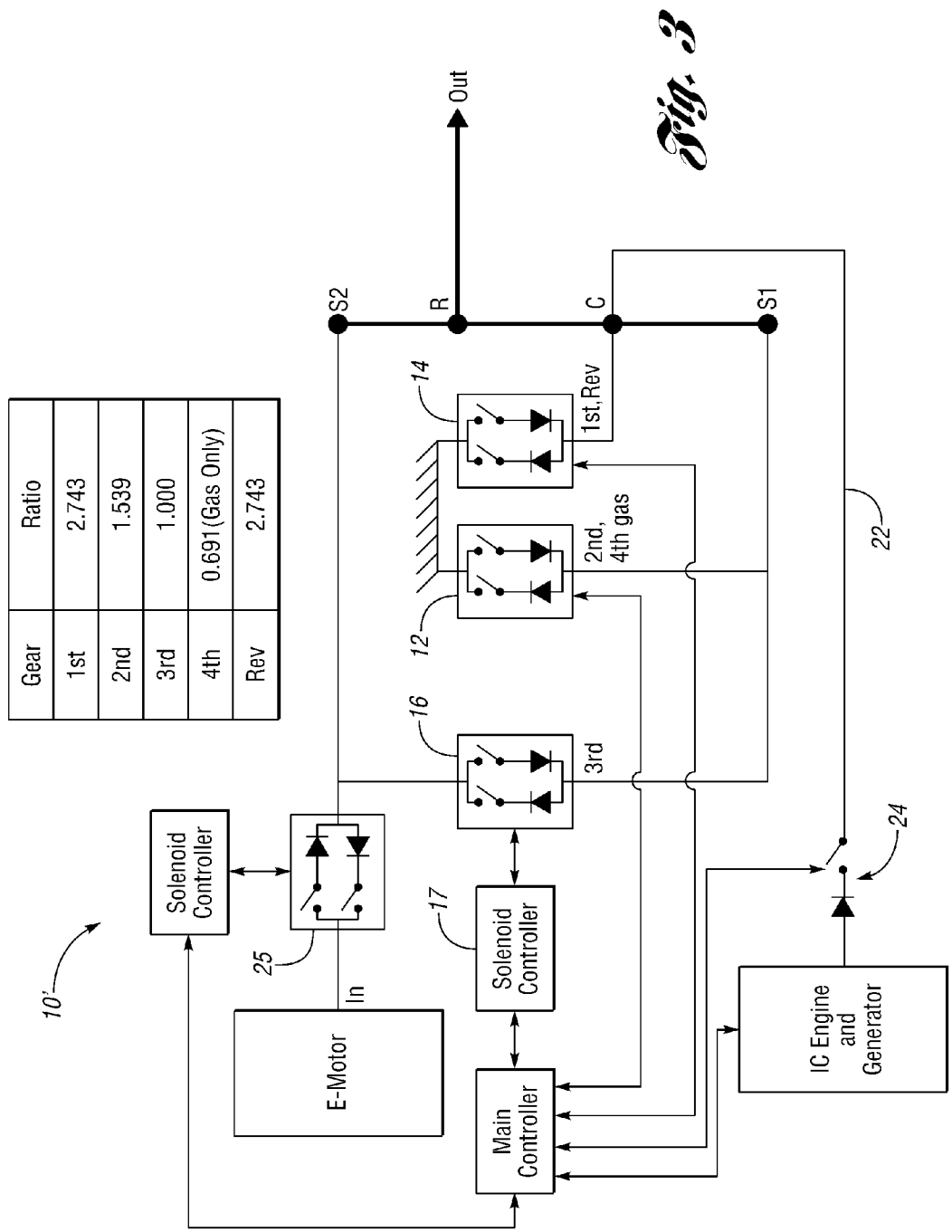
FIG. 3 includes a lever diagram and a corresponding gear/ratio table similar to the diagram and table of FIG. 2 and which corresponds to a drive system and transmission of another embodiment of the present invention.

FIG. 3 includes a lever diagram and corresponding gear/ratio table similar to the lever diagram and table of FIG. 2 of a transmission 10' formed from the transmission 10 with the addition of: 1) a shaft 22 through the center of the transmission 10' and splined to the carrier, C, and 2) a dynamic OWC 24 to add the ability to run a $4^{th}$ gear overdrive state with a gas or IC Engine and generator (or alternatively, with a Generator/E-Motor, or both an IC Engine and the Generator/E-Motor). The main electric drive motor (E-Motor) could be turned on for $4^{th}$ gear boost as well. The arrangement also works for a $3^{rd}$ gear state, as well, where any combination of the three power plants can be used. At highway speeds, one can exit EV Mode totally and just run the IC Engine in $4^{th}$ gear via the OWC 24. A 2-way dynamic controllable clutch 25 and its associated "on-board" solenoid controller between the main E-Motor and S2 allows a disconnect of the E-Motor in $4^{th}$ gear preventing parasitic losses.

Figure 4:
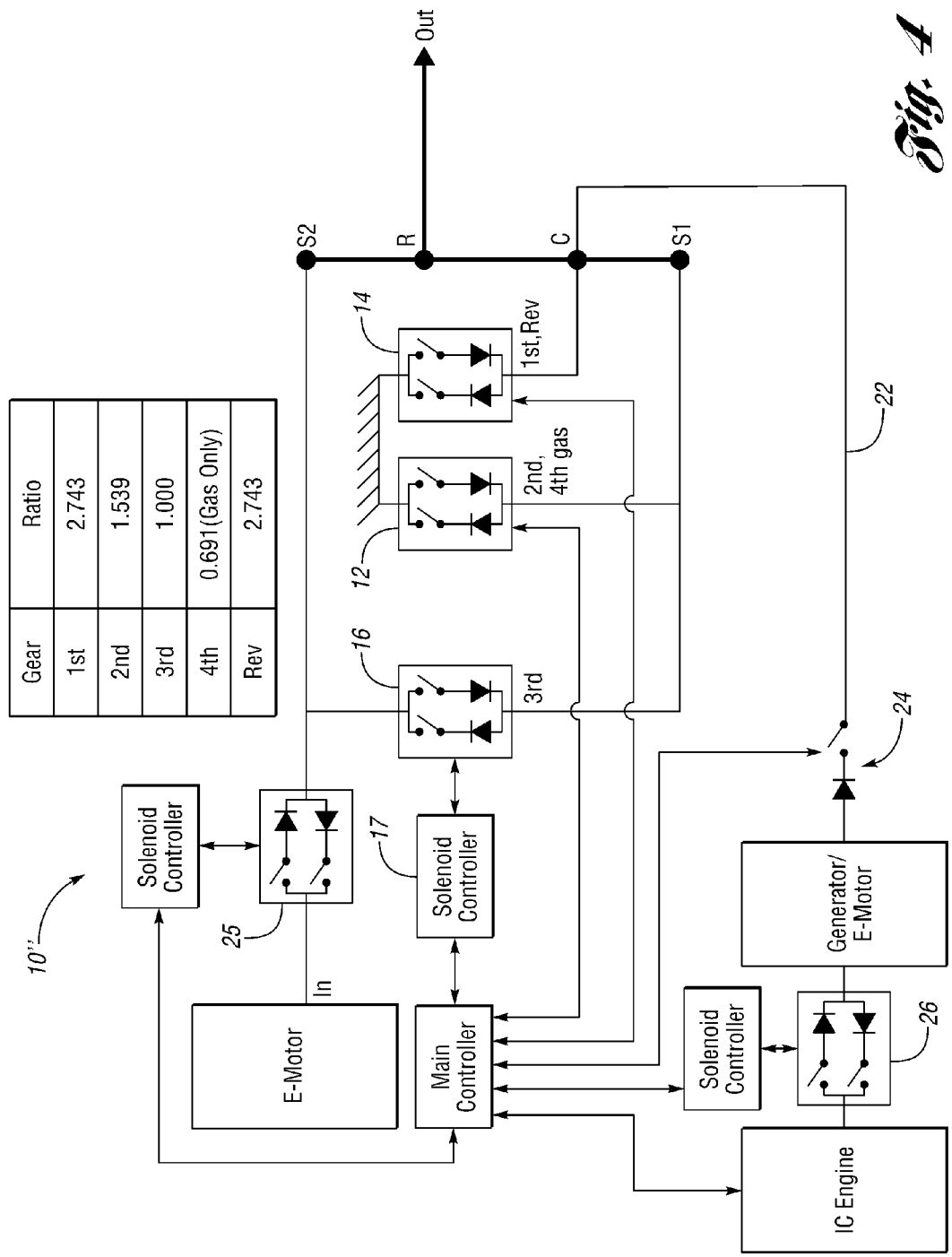
FIG. 4 includes a lever diagram and a corresponding gear/ratio table similar to the diagram and table of FIG. 3 and which corresponds to a drive system and transmission of yet another embodiment of the present invention.

FIG. 4 includes a lever diagram and corresponding gear/ratio table similar to the lever diagram and table of FIG. 3 of a transmission 10" with the further addition to the transmission 10' of another dynamic 2-way controllable clutch 26 and its "on-board" solenoid controller. In one operating mode, the 2-way clutch 26 allows the Gen/E-Motor to drive the IC Engine acting as a starter for the IC Engine. Current powertrains already have an E-Motor in their system. The E-Motor of the prior art performs a single task, it starts the gas motor. If the E-Motor that is added to the final drive above could also perform the task of starting the IC Engine, then the cost of adding this E-Motor could be greatly offset by the elimination of the starter motor for the gas engines of today. The other direction or operating state of the clutch 26 is to transfer power from the IC Engine to the gen/E-Motor to the output via the carrier. One reason to add a 2-way clutch, such as the clutch 26, is to disconnect the IC Engine from the Gen/E-Motor during EV mode.

The Gen (i.e., Generator/E-Motor) is used during the shifting transitions (without dragging the IC Engine along for the ride) thereby providing the ability to "CVT" from one gear state to the next steady state ratio (i.e., 1-2 or 2-3) without torque interruption at the output. Once one reaches the desired steady state ratio like $2^{nd}$ gear, for example, one uses the second gear controllable clutch 12 to latch that ratio. Once latched on, the Gen/E-Motor decays power gradually until clutch 12 is locked. This will eventually cause clutch 24 to freewheel. Once freewheeling, clutch 24 is turned completely off disconnecting the Gen/E-Motor from the transmission 10". This would make a smooth, quiet, seamless shift with no torque hole. In addition, while in a given gear state in EV Mode, the Gen/E-Motor can be turned on (with the clutch 24 engaged) to provide boost for desired transient acceleration events (like passing aggressively).

The main E-Motor and the gas engine (i.e., IC Engine) both have a path to deliver power to the driveline. These motors or power plants can be operated simultaneously if needed. Doing so could boost the performance of the vehicle without increasing the size of the gas engine or IC Engine.

Figure 10:
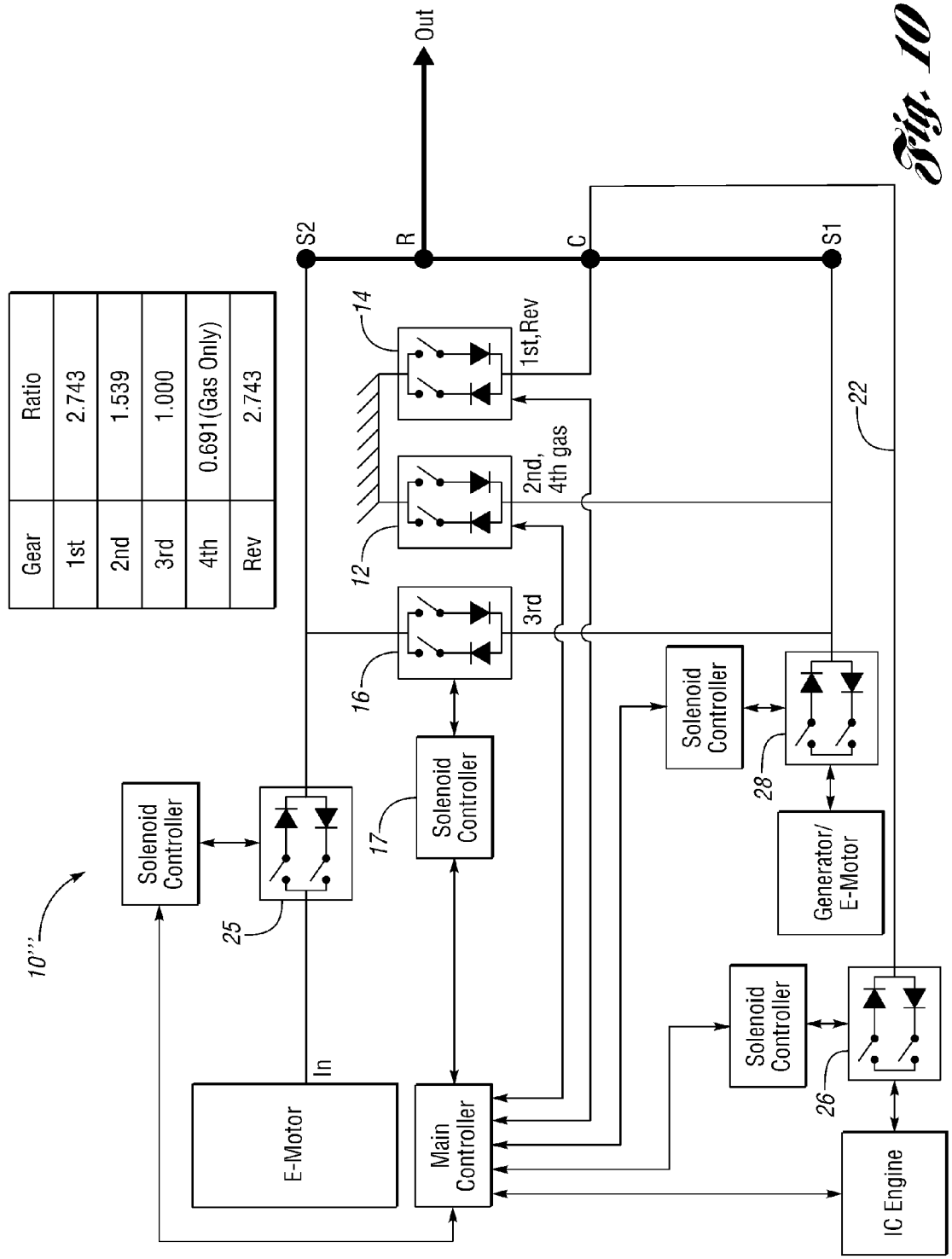
FIG. 10 is a lever diagram and a corresponding gear/ratio table similar to the diagrams and tables of FIGS. 3 and 4 and which correspond to a drive system and transmission of still another embodiment of the invention.

FIG. 10 includes a lever diagram and corresponding gear/ratio table similar to the lever diagrams and tables of FIGS. 3 and 4 of a transmission 10''' with the further addition to the transmission 10" of another dynamic 2-way controllable clutch 28 (instead of clutch 24) and its "on-board" solenoid controller. In one operating mode, the 2-way clutch 28 allows the Gen/E-Motor to drive the fourth member S1. In other words (and comparing FIGS. 4 and 10), The Gen/E-Motor has been taken off the carrier and attached to S1. By doing this, during hybrid mode, one obtains a Prius-like power flow instead of the Volt-like power flow of FIG. 4. The power flow of FIG. 10 in hybrid mode is more efficient than the power flow of FIG. 4 in hybrid mode. Consequently, the following three main modes are obtained: 3 speed EV (on battery power); Prius-like power flow in hybrid mode; and all-gas highway mode. The resulting transmission can be characterized as a 4-speed plug-in parallel hybrid with EV and gas-only modes.

The following chart indicates various operating stages or modes of the various transmissions and the corresponding coupling elements in relation with these operating modes.

| State/Mode | Low-Rev—cl-14 | | 2nd/4th—cl-12 | | 3rd—cl-16 | | E-MOT Cl-25 | | Gen Cl-24 | | IC Engine Clutch-26 | |
|---|---|---|---|---|---|---|---|---|---|---|---|---|
| | Fwd | Regen | Fwd | Regen | Fwd | Regen | Fwd | Regen | Fwd | N/A | Fwd | Starter |
| 1 EV | X | X | | | | | X | X | | | S | S |
| 1EV-Boost/CVT | X1 | | | | | | X | X | M | | O | O |
| 1 Mixed Mode | X1 | | | | | | X | X | M | | X | X |
| 2 EV | | | X | X | | | X | X | | | S | S |
| 2EV Boost/CVT | | | X1 | | | | X | X | M | | O | O |
| 2 Mixed Mode | | | X1 | | | | X | X | M | | X | X |
| 3 EV | | | | | X | X | X | X | | | S | S |
| 3 EV Boost/CVT | | | | | X | X | X | X | M | | O | O |
| 3 Mixed Mode | | | | | X | X | X | X | M | | X | X |
| 3 Gas | | | | | X | X | | | G | | X | X |

-continued

| State/Mode | Low-Rev—cl-14 | | 2nd/4th—cl-12 | | 3rd—cl-16 | | E-MOT Cl-25 | | Gen Cl-24 | | IC Engine Clutch-26 | |
|---|---|---|---|---|---|---|---|---|---|---|---|---|
| | Fwd | Regen | Fwd | Regen | Fwd | Regen | Fwd | Regen | Fwd | N/A | Fwd | Starter |
| 4EV | | | X | X | | | | | M | | | |
| 4EV Boost/CVT | | | X | X | | | X | X | M | | O | O |
| 4 Mixed Mode | | | X | X | | | | | M | | X | X |
| 4 Gas | | | X | X | | | | | G | | X | X |
| Rev 2.74 | X | X | | | | | X | X | | | | |
| Rev 1.53 | | | X | X | | | X | X | | | | |
| Rev 1.0 | | | | | X | X | X | X | | | | |
| Rev 0.69 | | | X | X | | | | | M | | | |

EV = Electric Mode, single E-Motor
Boost/CVT = 2 E-Motor Mode
Mixed Mode = Gas and Electric (1 or 2 E-Motors)
Gas—Gas only
M = Clutch is on and Gen/Motor is a Motor
G = Clutch is on and Gen/Motor is a Gen
O = Optional use of Gas Engine for Boost in EV Boost/CVT Mode
S = Serial Hybrid Mode, when the batteries are depleted ICE is running Gen to charge (on only for recharge during battery depletion)

 = Regen possible in this State/Mode

The addition of an electric motor (Gen/E-Motor) to the carrier, C, provides a reaction torque to the main E-Motor. The electric motor (Gen/E-Motor) adds enough torque to match the reaction torque, filling in the torque hole completely. The size of the electric motor required to do this is dependent upon the control and power strategy (i.e., the transmission control algorithm) for the electric motor. The electric motor can be overpowered significantly for a short duration (in this case up to 1 second) without doing any damage to the motor. The motor will not heat up for such a quick burst of power. The goal is to fill in the torque hole and make a seamless shift.

If the IC engine is "on" there is a potential torque hole during shifting. A "standard" shift (1/10 second shift by rapidly changing the main E-Motor speed) is usual when the IC Engine is "on" because it ties up the Gen/E-Motor as a generator and thus the Gen/E-Motor is not available to provide torque to the carrier, C. There are 2 shift modes, "enhanced" shifts and "standard" shifts. "Enhanced" shifts use two motors including the Gen/E-Motor (IC Engine is "off" and batteries are not depleted; in EV mode). "Standard" shifts use a single motor and a single one-way clutch and are used when the batteries are depleted causing the IC Engine to be "on" therefore not making the Gen/E-Motor available to act as an E-Motor input. Instead, it is acting as a generator forcing standard shifts when the IC Engine is "on" (battery depletion mode).

After the transmission 10" completes the 3-4 shift (i.e., transition from $3^{rd}$ EV mode to the $4^{th}$ gas mode), the gas engine (IC Motor) adds power to the driveline. The electric motor (i.e., E-Motor) can be turned off in a controlled manner such that the hand-off of the power to the driveline can seamlessly be transferred from the E-Motor to the IC engine. This can be accomplished with a control strategy and via the dynamic one-way clutch 24 between the Generator/E-Motor and the final drive. As the power/speed of the gas motor overcomes the power/speed of the E-Motor, the one-way clutch state (of clutch 16) will change from a locked state (providing a torque path from the E-Motor to the driveline) to a free-wheel state where the E-Motor will not be providing power to the driveline. At this point the E-Motor is turned off.

Due to the two-way clutch 25 between the E-Motor and S2, the E-Motor can go to zero RPM state while the IC engine is powering the vehicle in $4^{th}$ gear operation. The E-Motor is not spinning when it is not operational. This approach prevents parasitic losses (magnetic drag inside the E-Motor) from impacting the overall efficiency of the current powertrain system while the IC engine is in operation.

In $2^{nd}$, $3^{rd}$ and $4^{th}$ gear operation, it is possible to have a parallel hybrid by using the IC Engine and the 2 E-machines (motors) in any desired combination. This power flow is a series (EV Mode), a parallel (Mixed Mode), and a gas (or other fuel) only mode design.

Figure 5:
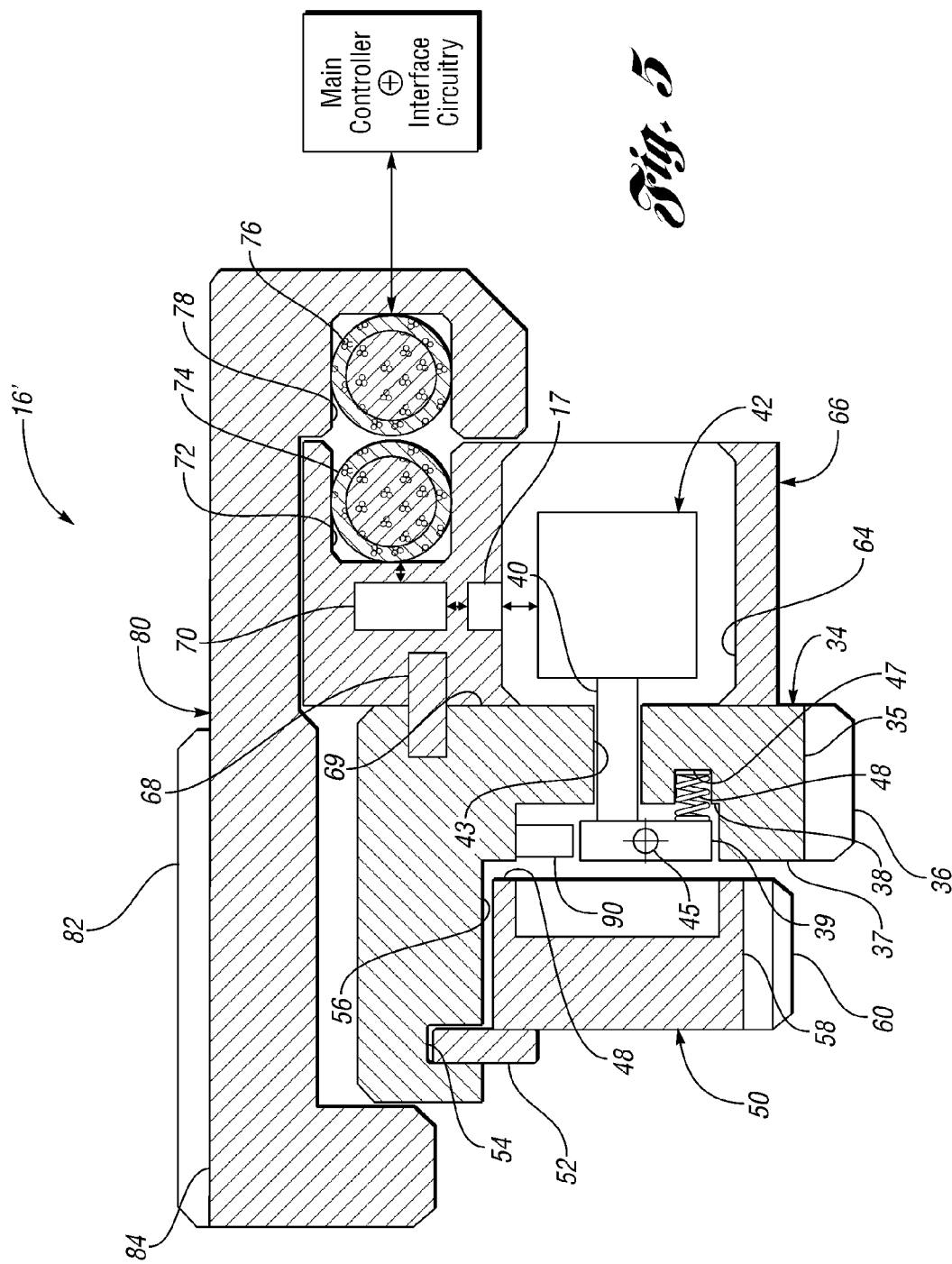
FIG. 5 is a side schematic, sectional view of a dynamic selectable or controllable clutch with an "on-board" solenoid controller or subsystem for use in the transmissions of FIGS. 1-4.

FIG. 5 is a side schematic, sectional view of one of the dynamic selectable or controllable clutches 16, 16', 24, 25 and 26 with "on-board" solenoid controller or system constructed in accordance with at least one embodiment of the present invention. Such dynamic clutches are generally of the type shown in U.S. patent publication 2010/0252384.

Figure 8:
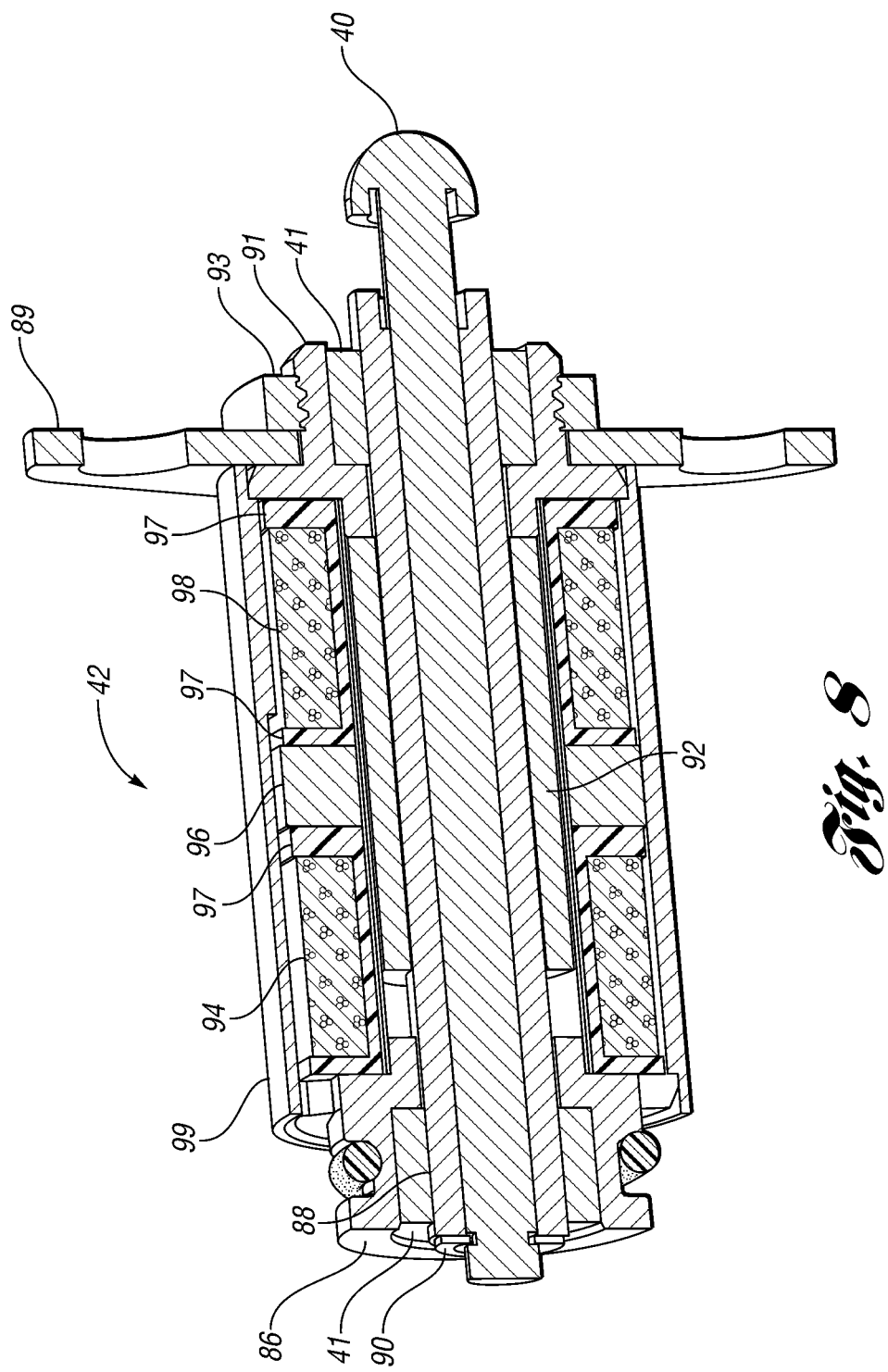
FIG. 8 is a sectional perspective view of a magnetically latching solenoid for use in the clutch of FIG. 5.

The assembly 16' includes an annular pocket plate, generally indicated at 34. An inner axially-extending surface 35 of the plate 34 has internal splines 36 for engagement with a torque transmitting element of the transmission 10 or 10' or 10". An inner, radially-extending face or surface 37 of the plate 34 is formed with spaced reverse pockets 38 in which reverse struts 39 are received and retained to pivot therein about a pivot 45. One end portion of each reverse strut 39 is normally biased outwardly by a coil spring 48 disposed with an aperture 47 of the pocket 38. The opposite end portion of each reverse strut 39 is controlled by a central domed plunger or push pin 40 of a magnetically latching solenoid, generally indicated at 42. As indicated in FIG. 8, the latching solenoid 42 is mounted to the plate 34 within the cavity 64 by a mounting flange 89 which is held on an end housing member 91 by a locking collar 93. A second end housing member 86 closes the opposite end of solenoid 42 and may include an O-ring for sealing purposes. The solenoid 42 also includes an exterior housing member 99.

The push pin 40 (which is shown in its fully extended position in FIG. 8) together with an armature 92 of the solenoid reciprocate together within the solenoid 42 so that the pin 40 reciprocates within a passage 43 of the plate 34. The push pin 40 is supported for reciprocating motion by a Teflon-coated inner surface of a cylindrical member 88. A locking ring 90 moves with the pin 40. The member 88 is supported at its opposite ends of the solenoid 42 by members 41. The armature 92 is positioned adjacent an upper coil assembly 94, a permanent magnet 96 and a lower coil assembly 98. The coil assemblies 94 and 98 include coils embedded within a suitable resin 97.

The passage 43 communicates the cavity 64 of a frame rail, generally included at 66, in which the solenoid 42 is housed with the pocket 38 to actuate the opposite end portion of its reverse strut and overcome the bias of its spring. Preferably, at least two reverse struts 39 are provided. One latching solenoid (such as latching solenoid 42) is provided for each reverse strut. However, it is to be understood that a greater or lesser member of reverse struts 39 and corresponding latching solenoids 42 may be provided to control the operating mode or state of the clutch 16.

The face or radial surface 37 of the pocket plate 34 is also formed with spaced forward pockets (now shown) in which forward struts (not shown) are received and retained to pivot therein. Like the reverse struts 39, one end portion of each forward strut is normally biased outwardly by a coil spring (not shown) disposed within an aperture (not shown) of the plate 34. Each opposite end portion of the forward struts are controllably actuated or moved by an actuating end portion or part of an armature of a forward, magnetically latching solenoid (not shown but substantially the same in function and structure as the reverse magnetically latching solenoid 42). The armature of each forward magnetically latching solenoid reciprocates within a passage which communicates its pocket with the cavity in which its solenoid is housed to overcome the bias of its coil spring. Preferably, two forward struts are provided. However, it is to be understood that a greater or lesser number of forward struts may be provided with a forward, magnetically latching solenoid for each forward strut to control the operating state or mode of the clutch 16. Also, it is to be understood that the end portion or part of each armature may support different types of strut actuators such as pins or springs to move therewith. Springs (not shown) preferably bias the pin 40 between its extended and retracted positions. For example, one spring may be located between the ring 90 and one end of the member 88 and a second spring may be located between the other end of the member 88 and the inner surface of the dome of the pin 40.

As shown in U.S. patent publication No. 2010/0252384 (but not shown in FIG. 5 but shown at 208 in FIG. 9), the assembly 16' may also include a middle plate or element, having a plurality of spaced apertures extending completely therethrough to allow the reverse struts and the forward struts to pivot in their pockets and extend through their corresponding apertures to engage spaced locking formations or notches formed in a radially extending face or surface 48 of a notch plate, generally indicated at 50. The forward and/or reverse struts engage the locking formations during linear movement of the push pin 40 towards the plate 50. The forward and/or reverse struts disengage the locking formations during linear movement of the push pin 40 away from the plate 50 under the biasing action of the corresponding forward and/or reverse coil springs.

A snap ring 52 is disposed within a groove 54 formed in an axial surface 56 of the plate 34 to retain the notch plate 50 with the pocket plate 34. The ring 52 holds the plates 50, 34 and the middle plate (not shown) together and limit axial movement of the plates relative to one another. An inner axially extending surface 58 of the plate 50 has internal splines 60 for engagement with a torque transmitting element of the transmission 10'.

The forward struts lock the notch plate 50 to the pocket plate 34 in one direction of relative rotational movement about an axis but allow free-wheeling in the opposite direction about the axis. The reverse struts perform the same locking function in the opposite direction.

Each solenoid 42 is disposed in its cavity 64 formed in the frame rail 66. In turn, the frame rail 66 is press fit via dowel pins 68 into the back side or surface 69 of the pocket plate 34 so that the frame rail 66 rotates with the plate 34. The frame rail 66 houses the solenoid controller 17 and associated electronics 70 for the solenoids within the frame rail 66. In general, the solenoid controller 17 bi-directionally communicates data from and to the main controller via an interface circuit including rotating and static transformer inductors or coils 74 and 76, respectively. The coils 74 and 76 also help communicates or couples power from a power source to the latching solenoids.

The frame rail 66 has a second cavity 72 in which the rotating transformer coil 74 is housed to rotate therewith. The coils 74 are electromagnetically coupled to the static coils 76 which are housed in a third cavity 78 formed in an aluminum housing 80. The housing 80 is grounded or fixed to the transmission housing by splines 82 formed on an axially extending exterior surface 84 of the housing 80. The main controller sends both modulated and unmodulated power signals to the static coils 76 which, in turn, induces corresponding signals in the rotating coils 74 across the gap between the rotating frame rail 66 and the fixed housing 80.

The solenoid controller 17 converts the AC power signals to DC power signals downstream of the rotating coils 74 to induce current in selected ones of the solenoids 42 under control of the controller 17. The controller 17 and associated electronics 70 split the signals and directs the signals to separately control the brake side and drive side of the OWC 16 (independent control and actuation of the reverse and forward struts via the latching solenoids 42). The controller 17 and the electronics 70 also act as a communication bus for the control data or signals to and from the main controller and the rotating clutch 16'. Examples of what are communicated are:

Send a signal to the main controller verifying "OFF" and "ON" positions (feedback signal) generated from a position sensor or transducer 90 disposed within the pocket plate 34 adjacent the strut 39 within or immediately adjacent the pocket 38. The position sensor 90 may include an electromagnetic coil or inductor embedded within or surrounded by a suitable resin and disposed within a coil housing. The resulting sensor 90 is disposed within a cavity formed in the plate 34 or in the pocket 38 in which the strut 39 is located. The coil is energized by a DC voltage by the microprocessor to generate a magnetic flux which, as long as the strut 39 is in the pocket 38, flows through the coil housing, through a portion of the strut 39 and across the small air gaps between the coil housing and the strut 39. When the strut 39 pivots out of the pocket 38, the magnetic flux is broken which condition is sensed by the microprocessor. In this way, the states or positions of the struts 39 are monitored by the microprocessor.

The OWC 16 goes "OFF" when there is a loss of power in the system. A signal is sent to the clutch 16' saying power is "ON". If that signal fails, one or more capacitors (which are typically maintained charged) in the electronics 70 fire into the coils 94 and/or 98 of the solenoids 42 and latch the solenoids 42 in their "OFF" position.

The control system has the capability to communicate control data and feedback signals using the same circuit (i.e., the controller 17 and the electronics 70) by which power is delivered to the solenoids 42 (i.e., the frame rail 66 may be modified to add sensors/the electronics 70/the controller 17).

The solenoid controller 17 may comprise a programmed microprocessor to control initialization and strut actuation, preferably by directly or indirectly controlling current supplied to the solenoids 42 in the form of pulses which function as drive signals for the solenoids.

The various components or functions of controller 17 may be implemented by a separate controller as illustrated, or may be integrated or incorporated into the transmission 10' or the main controller, depending upon the particular application and implementation. The solenoid controller 17 may include control logic to control the AC signals and one or more switching devices (such as transistors) to selectively store and recover energy from one or more energy storage devices (such as capacitors) and/or to selectively provide a start-up control switch. Control logic which may be implemented in hardware, software, or a combination of hardware and software, then controls the corresponding strut actuator(s) to implement the solenoid control algorithm.

Transfer of Electrical Power

Figure 6:
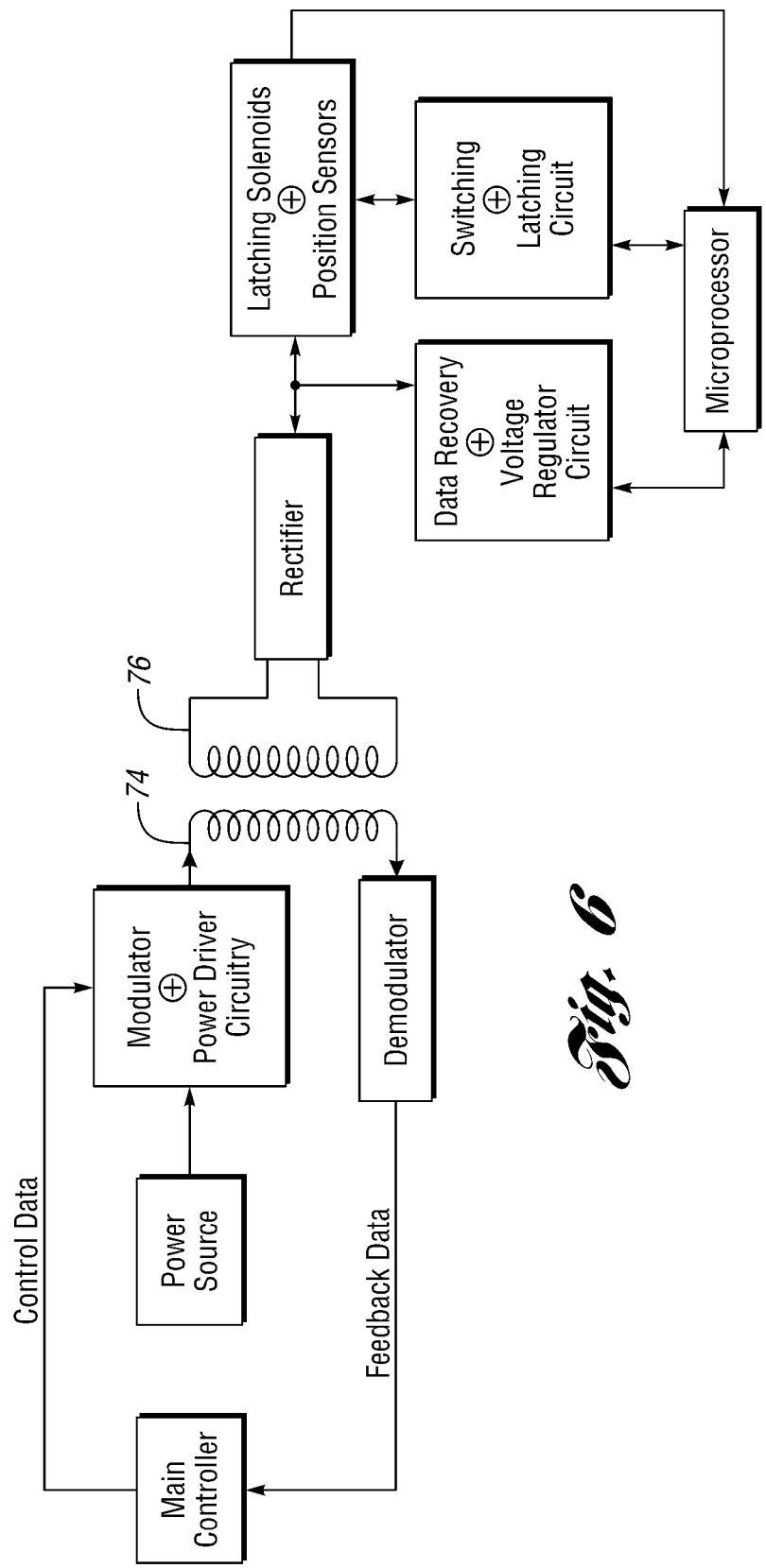
FIG. 6 is a block diagram of a one-way electrical power and two-way communication apparatus for use with the clutch of FIG. 5.

Referring now to FIG. 6, there is shown a one-way electrical power and two-way data communication apparatus of the preferred embodiment of this invention, coupled to a main controller and a source of electrical power. The apparatus is generally of the type described in U.S. Pat. No. 5,231,265. Specifically, the apparatus includes the inductors or coils 74 and 76, a modulator and power driver circuitry, a demodulator, a rectifier, latching solenoids and position sensors, a data recovery and voltage regulator circuit, a switching and latching circuit and a microprocessor. The modulator and power driver circuitry is coupled to the electrical power source and to the main controller. The modulator and power driver circuitry transfers the electrical power signal from the source to the inductor 74 which, in turn, transfers the electrical power signal to the inductor 76 by means of magnetic flux between the inductors 74 and 76. Thereafter, the inductor 76 couples the received electrical power signal to the rectifier. The rectifier is coupled to each of the latching solenoids 42 contained within each of the cavities 64 and acts to transfer this received electrical power to a latching solenoid 42 selected by the microprocessor. Additionally, the output of the rectifier is input into a voltage regulator which produces a DC output voltage at a level which is required by the microprocessor.

Upon receipt of the electrical power signal from the inductor 74, the inductor 76 outputs this electrical signal to the rectifier which rectifies the received AC electrical power signal to obtain a DC signal which is controllably coupled to each of latching solenoids disposed within each of the cavities 64. While this power is coupled to the individual latching solenoids, none of the electrical power flows therethrough due to the field effect transistors of the switching and latching current. That is, each of the individual latching solenoids 42 is coupled to a unique field effect transistor. The output of the rectifier is then applied and flows through its individual latching solenoid 42 only when its uniquely associated field effect transistor is enabled or is activated by the microprocessor. If the individual field effect transistor associated with a particular latching solenoid 42 is disabled, then the flow of electrical power to that individual latching solenoid 42 is blocked or prevented and, consequently, that latching solenoid 42 is not energized.

The microprocessor is coupled to each of the field effect transistors and to the position sensors 90 which sense the position of the struts 39. The position sensors 90 are deployed within the frame rail 66 so as to generate a signal representative of the position of the struts 39 actuated by each of the latching solenoids 42. The position signals are downloaded to the microprocessor, where they are stored by the microprocessor and later output therefrom.

Two-Way Data Communication

The modulator and power driver circuitry has an input which receives control data from the main controller. The electrical power signal received by the circuitry (from the power source) is modulated by the control data from the main controller. A tuned circuit in the circuitry has a resonant frequency. The resonant frequency provides an efficient transfer of electrical power to the latching solenoids from the electrical power source. When it is desired to transmit control data from the main controller 12 to the latching solenoids, the control data is transmitted to the circuitry. The circuitry causes a signal to be produced in the inductor 74 which comprises a variation or a modulation of the electrical power signal according to the control data. After such control data is sent, the circuitry then transfers electrical power to the inductor 76 (via the inductor 74) which is substantially un-altered or unmodulated. That is, the electrical power signal from the power source is initially varied according to the control data received from the main controller. In this manner, control data may be transmitted from the main controller to the microprocessor without the need for a physical connection therebetween or some sort of additional communication apparatus.

Not only is electrical power transferred to the individual latching solenoids in the form of pulses (for purposes of activating these solenoids), but the same electrical power signal is modified or varied according to control or feedback data which is desired to be sent to the microprocessor from the main controller. In this manner, the solenoids and the solenoid controller may be deployed in an inaccessible place (since no physical connections between the solenoid controller and main controller are necessary) making the solenoid controller much more adaptable to various situations while maintaining simplicity in overall design.

Figure 7:
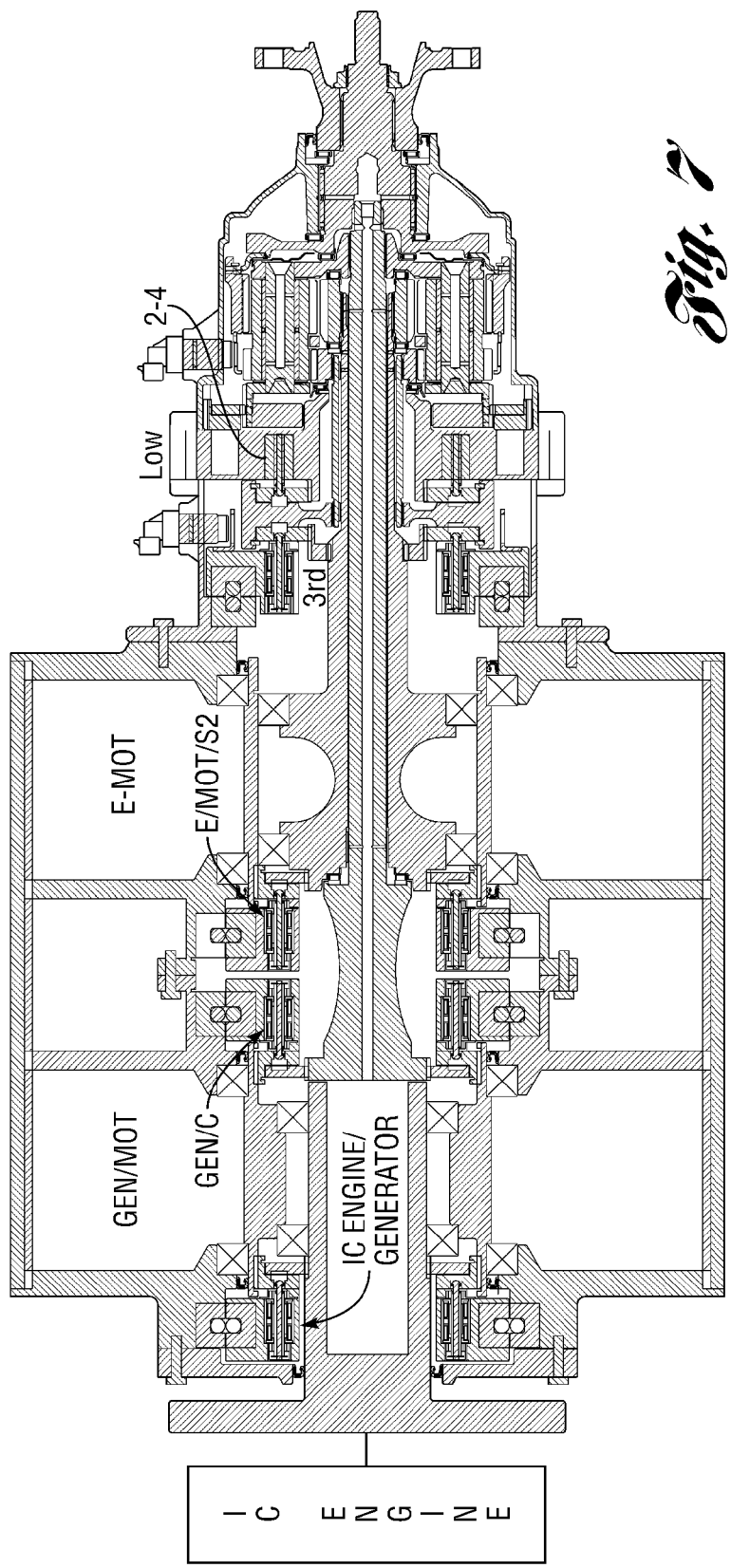
FIG. 7 is a cross-sectional view of the drive system and transmission of FIG. 4.

When an individual field effect transistor activates its associated latching solenoid a load is reflected to the inductor 74 by means of the flux communication between the inductor 76 and the inductor 74. By periodically activating and deactivating the field effect transistor, the programmed microprocessor causes a variation in the flux between the inductors 74 and 76. This flux occurs and/or exists because of the aforementioned transfer of electrical power between the inductors 74 and 76. This variation in the flux is used in the preferred embodiment of the invention, to send feedback data from the solenoid controller to the main controller via the demodulator. This feedback data is transmitted to the main controller by the selective activation and deactivation, of one of the field effect transistors by the microprocessor. In this manner feedback data such as strut position data may be transferred, from the position sensors 90 to the solenoid controller and then to the main controller, without the need for physical connection between the solenoid controller and the main controller FIG. 7 is a cross-sectional view of the entire powertrain of FIG. 4. It is a 4-speed transmission with an E-Machine module incorporated into the transmission. The E-Machine module includes the Generator/E-Motor and the main drive motor (E-Motor). There are two 2-way clutches connecting the IC Engine to the Gen/Mot (the starter clutch which allows the generator to start the IC Engine and a drive clutch transferring power from the IC Engine to the Gen). The other two-way clutch connects the main drive E-Motor (the right most motor) to the back sun gear in the transmission (S2). There is also a 1-way clutch that connects the generator/motor to the carrier C in the transmission.

In the E-Machine module the controllable clutches are embedded into the rotors of the E-Machines. The E-machines with their embedded clutches are combined and put in a common case of the transmission.

Figure 9:
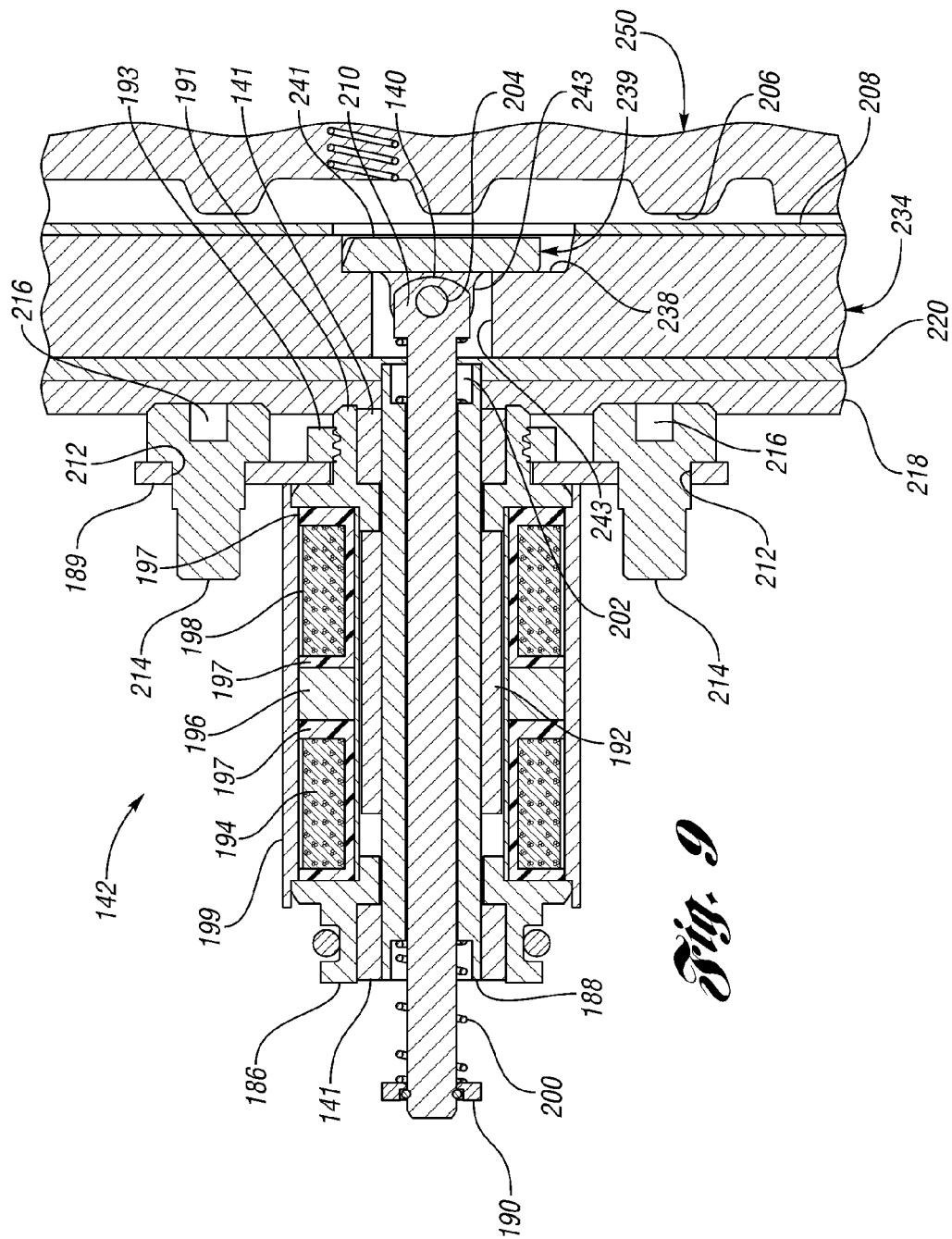
FIG. 9 is a sectional schematic view of a latching solenoid "on-board" the clutch assembly of FIG. 5.

Referring now to FIG. 9, there is shown a second embodiment of a latching solenoid 192 for controlling a coupling or clutch assembly. The coupling or clutch assembly includes an annular clutch plate 250 having at least locking formation 206 formed thereon and an annular pocket member or plate, generally indicated at 234. An inner axially-extending surface of the plate 234 has internal splines for engagement with a torque transmitting element of a vehicular transmission. An inner, radially-extending face or surface of the plate 234 is formed with spaced reverse pockets 238 in which reverse struts 239 are received and retained to pivot therein about a pivot 204 which pivotally connects an end portion 210 of an actuator 140 to the strut 239. The opposite end portion of the actuator 140 is normally biased to the left by a coil spring 200 disposed between a ring 190 mounted on the actuator 140 and an end portion of a cylindrical member 188. An engaging portion of each reverse strut 239 is controlled by the actuator 140 which has the form of a domed plunger or push pin of a magnetically latching solenoid, generally indicated at 142. As indicated in FIG. 9, the latching solenoid 142 is mounted to an apertured plate 218 within the cavity 64 by a mounting flange 189 which is held on an end housing member 191 by a locking collar 193. Mounting members 214 extend through apertures 212 formed through the flange 189 and are secured to locking formations 216 on a surface of the plate 218. Another apertured plate 220 may be used to secure the plate 218 to the plate 234. A second end housing member 186 closes the opposite end of solenoid 142 and may include an O-ring for sealing purposes. The solenoid 142 also includes an exterior housing member 199.

The push pin or actuator 140 (which is shown in its fully extended position in FIG. 4) together with an armature 192 of the solenoid 142 reciprocate together within the solenoid 142 so that the pin 140 reciprocate within a passage 243 of the plate 234. The push pin 140 is supported for reciprocating motion by Teflon-coated inner surface of the cylindrical member 188. The locking ring 190 moves with the pin 140. The member 188 is supported at its opposite ends of the solenoid 142 by members 141. The armature 192 is positioned adjacent an upper coil assembly 194, a permanent magnet 196 and a lower coil assembly 198. The coil assemblies 194 and 198 include coils embedded within a suitable resin 197. Springs 200 and 202 bias the pin 140 between its extended and retracted positions. For example, the spring 200 is located between the ring 190 and one end of the member 188 and the spring 202 is located between the other end of the member 188 and the inner surface of the dome portion 210 of the pin 140.

The passage 243 communicates the cavity 64 of a frame rail, generally included at 66, in which the solenoid 142 is housed with the pocket 238 to actuate the end portion of its reverse strut 239 and overcome the bias of the spring 200.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle drive system including a transmission, the system comprising:
    a compound planetary gear set including first, second, third and fourth elements, the second element comprising a ring gear continuously connecting with an output shaft of the transmission;
    a transmission housing;
    an electric motor having an output shaft connecting with the first and fourth elements for driving the first and fourth elements in response to an electrical signal to obtain a desired transmission ratio;
    a non-friction controllable clutch assembly being non-hydraulically controlled to change between a coupling state for coupling the fourth element to the motor output shaft and an uncoupling state for uncoupling the fourth element from the motor output shaft; and
    a non-friction controllable brake assembly having a coupling state for coupling the third element to the housing and an uncoupling state for uncoupling the third element from the housing, the brake assembly being non-hydraulically controlled to change state to maintain the desired transmission ratio.

2. The system as claimed in claim 1 further comprising a non-friction controllable second brake assembly, having a coupling state for coupling the fourth element to the housing and an uncoupling state for uncoupling the fourth element from the housing, the second brake assembly being non-hydraulically controlled to change state to maintain the desired transmission ratio.

3. The system as claimed in claim 1 wherein the first, third and fourth elements comprise a first sun gear, a carrier and a second sun gear, respectively.

4. The system as claimed in claim 1 wherein the third element is connecting with an output shaft of a power plant and wherein the system further comprises a non-friction clutch assembly being non-hydraulically controlled to change between a coupling state for coupling the third element to the power plant output shaft and an uncoupling state for uncoupling the third element from the power plant output shaft.

5. The system as claimed in claim 1 wherein the electric motor is mounted within the housing.

6. The system as claimed in claim 1 wherein the transmission is an automatic transmission.

7. The system as claimed in claim 1 wherein the transmission is a multi-speed, step ratio transmission for automotive vehicles.

8. The system as claimed in claim 1 further comprising an electromechanical apparatus to control the state of the clutch assembly in response to an electrical power signal.

9. The system as claimed in claim 8 wherein the electromechanical apparatus includes a latching solenoid.

10. A vehicle drive system including a transmission, the system comprising:

a compound planetary gear set including first, second, third and fourth elements, the second element comprising a ring gear continuously connecting with an output shaft of the transmission;

a transmission housing;

an electric motor having an output shaft connecting with the first and fourth elements for driving the first and fourth elements in response to an electrical signal to obtain a desired transmission ratio;

a non-friction controllable clutch assembly being non-hydraulically controlled to change between a coupling state for coupling the fourth element to the motor output shaft and an uncoupling state for uncoupling the fourth element from the motor output shaft; and a non-friction clutch assembly being non-hydraulically controlled to change between a coupling state for coupling the first element to the motor output shaft and an uncoupling state for uncoupling the first element from the motor output shaft.

11. The system as claimed in claim 10 further comprising a non-friction controllable brake assembly having a coupling state for coupling the fourth element to the housing and an uncoupling state for uncoupling the fourth element from the housing, the brake assembly being non-hydraulically controlled to change state to maintain the desired transmission ratio.

12. A vehicle drive system including a transmission, the system comprising:

a compound planetary gear set including first, second, third and fourth elements, the second element comprising a ring gear continuously connecting with an output shaft of the transmission;

a transmission housing;

an electric motor having an output shaft connecting with the first and fourth elements for driving the first and fourth elements in response to an electrical signal to obtain a desired transmission ratio;

a non-friction controllable clutch assembly being non-hydraulically controlled to change between a coupling state for coupling the fourth element to the motor output shaft and an uncoupling state for uncoupling the fourth element from the motor output shaft; and a power plant having an output shaft wherein the system further comprises a non-friction clutch assembly being non-hydraulically controlled to change between a coupling state for coupling the power plant output shaft to an output shaft of an engine and an uncoupling state for uncoupling the power plant output shaft from the engine output shaft.

13. The system as claimed in claim 1 wherein the electric motor is utilized for regenerative braking in response to a control signal.

14. The system as claimed in claim 1 wherein the clutch assembly includes an overrunning coupling assembly which allows the fourth element to free-wheel relative to the motor output shaft in the uncoupling state.

15. The system as claimed in claim 14 wherein the clutch assembly includes a first member coupled to the fourth element, a second member coupled to the motor output shaft and at least one ratcheting member for selectively coupling the first and second members together in the coupling state.

16. A vehicle drive system including a three-speed transmission, the system comprising:

a compound planetary gear set including first, second, third and fourth elements, the second element comprising a ring gear continuously connecting with an output shaft of the transmission;

a transmission housing;

an electric motor having an output shaft connecting with the first and fourth elements for driving the first and fourth elements in response to an electrical signal to obtain a desired transmission ratio;

non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio; and a non-friction clutch assembly being non-hydraulically controlled to change between a coupling state for coupling the fourth element to the motor output shaft and an uncoupling state for uncoupling the fourth element from the motor output shaft.

17. The system as claimed in claim 16 wherein the first, third and fourth elements comprise a first sun gear, a carrier and a second sun gear, respectively.

18. The system as claimed in claim 16 wherein the electric motor is utilized for regenerative braking in response to a control signal.

19. The system as claimed in claim 16 wherein the electric motor is mounted on the housing.

20. The system as claimed in claim 16 wherein the transmission is an automatic transmission.

21. The system as claimed in claim 16 wherein the transmission is a multi-speed, step ratio transmission for automotive vehicles.

22. The system as claimed in claim 16 wherein the clutch assembly includes an overrunning coupling assembly which allows the fourth element to free-wheel relative to the motor output shaft in the uncoupling state.

23. The system as claimed in claim 22 wherein the clutch assembly includes a first member coupled to the fourth element, a second member coupled to the motor output shaft and at least one ratcheting member for selectively coupling the first and second members together in the coupling state.

24. The system as claimed in claim 16 further comprising an electromechanical apparatus to control the state of the clutch assembly in response to an electrical power signal.

25. The system as claimed in claim 24 wherein the electromechanical apparatus includes a latching solenoid.

26. A vehicle drive system including a multi-speed transmission, the system comprising:

a compound planetary gear set including first, second, third and fourth elements, the second element comprising a ring gear continuously connecting with an output shaft of the transmission and the third element connecting with an output shaft of a power plant;

a transmission housing;

an electric motor having an output shaft connecting with the first and fourth elements for driving the first and fourth elements in response to an electrical signal to obtain a desired transmission ratio;

non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio;
a non-friction first clutch assembly being non-hydraulically controlled to change between a coupling state for coupling the fourth element to the motor output shaft and an uncoupling state for uncoupling the fourth element from the motor output shaft;
a non-friction second clutch assembly being non-hydraulically controlled to change between a coupling state for coupling the first element to the motor output shaft and an uncoupling state for uncoupling the first element from the motor output shaft; and
a non-friction third clutch assembly being non-hydraulically controlled to change between a coupling state for coupling the third element to the power plant output shaft and an uncoupling state for uncoupling the third element from the power plant output shaft.

27. The system as claimed in claim 26 wherein the first, third and fourth elements comprise a first sun gear, a carrier and a second sun gear, respectively.

28. The system as claimed in claim 26 wherein the electric motor is utilized for regenerative braking in response to a control signal.

29. A vehicle drive system including a multi-speed transmission, the system comprising:
a power plant having an output shaft;
a compound planetary gear set including first, second, third and fourth elements, the second element comprising a ring gear continually connecting with an output shaft of the transmission and the third element connecting with the power plant output shaft;
a transmission housing;
an electric motor having an output shaft connecting with the first and fourth elements for driving the first and fourth elements in response to an electrical signal to obtain a desired transmission ratio;
non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio;
a non-friction first clutch assembly being non-hydraulically controlled to change between a coupling state for coupling the fourth element to the motor output shaft and an uncoupling state for uncoupling the fourth element from the motor output shaft;
a non-friction second clutch assembly being non-hydraulically controlled to change between a coupling state for coupling the first element to the motor output shaft and an uncoupling state for uncoupling the first element from the motor output shaft;
a non-friction third clutch assembly being non-hydraulically controlled to change between a coupling state for coupling the third element to the power plant output shaft and an uncoupling state for uncoupling the third element from the power plant output shaft;
a non-friction fourth clutch assembly being non-hydraulically controlled to change between a coupling state for coupling the power plant output shaft to an engine output shaft and an uncoupling state for uncoupling the power plant output shaft from the engine output shaft.

30. The system as claimed in claim 29 wherein the first, third and fourth elements comprise a first sun gear, a carrier and a second sun gear, respectively.

31. The system as claimed in claim 29 wherein the electric motor is utilized for regenerative braking in response to a control signal.

32. The system as claimed in claim 29 wherein the electric motor and the power plant are mounted within the housing.

33. A vehicle drive system including a transmission, the system comprising:
a compound planetary gear set including first, second, third and fourth elements, the second element comprising a ring gear continuously connecting with an output shaft of the transmission, the third element connecting with an engine output shaft;
a transmission housing;
an electric motor having an output shaft connecting with the first and fourth elements for driving the first and fourth elements in response to a first electrical signal;
a non-friction controllable first clutch assembly being non-hydraulically controlled to change between a coupling state for coupling the fourth element to the motor output shaft and an uncoupling state for uncoupling the fourth element from the motor output shaft;
a power plant having an output shaft connecting with the fourth element for driving the fourth element in response to a second electrical signal; and
a non-friction controllable second clutch assembly being non-hydraulically controlled to change between a coupling state for coupling the fourth element to the power plant output shaft and an uncoupling state for uncoupling the fourth element from the power plant output shaft.

34. The system as claimed in claim 33 further comprising a non-friction controllable brake assembly having a coupling state for coupling the fourth element to the housing and an uncoupling state for uncoupling the fourth element from the housing, the brake assembly being non-hydraulically controlled to change state to maintain the desired transmission ratio.

35. The system as claimed in claim 33 further comprising a non-friction controllable brake assembly having a coupling state for coupling the third element to the housing and an uncoupling state for uncoupling the third element from the housing, the brake assembly being non-hydraulically controlled to change state to maintain the desired transmission ratio.

36. The system as claimed in claim 33 further comprising non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio.

37. The system as claimed in claim 33 wherein the first, third and fourth elements comprise a first sun gear, a carrier and a second sun gear, respectively.

38. The system as claimed in claim 33 further comprising a non-friction controllable third clutch assembly being non-hydraulically controlled to change between a coupling state for coupling the first element to the motor output shaft and an uncoupling state for uncoupling the first element from the motor output shaft.

39. The system as claimed in claim 33 wherein the electric motor and the power plant are mounted within the housing.

40. The system as claimed in claim 33 wherein the transmission is an automatic transmission.

41. The system as claimed in claim 33 wherein the transmission is a multi-speed, step ratio transmission for automotive vehicles.

42. The system as claimed in claim 33 wherein the power plant comprises an electric motor.

43. The system as claimed in claim 33 wherein the second clutch assembly includes an overrunning coupling assembly which allows the fourth element to free-wheel relative to the power plant output shaft in the uncoupling state.

44. The system as claimed in claim 43 wherein the second clutch assembly includes a first member coupled to the fourth element, a second member coupled to the power plant output shaft and at least one ratcheting member for selectively coupling the first and second members together in the coupling state.

45. The system as claimed in claim 33 further comprising an electromechanical apparatus to control the state of the second clutch assembly in response to an electrical power signal.

46. The system as claimed in claim 45 wherein the electromechanical apparatus includes a latching solenoid.

47. The system as claimed in claim 33 wherein the system includes a plurality of non-friction, non-hydraulically controlled coupling assemblies including the second clutch assembly.

48. The system as claimed in claim 47 wherein the plurality of non-friction coupling assemblies includes at least one one-way brake assembly.

49. A vehicle drive system including a multi-speed transmission, the system comprising:
a compound planetary gear set including first, second, third and fourth elements, the second element comprising a ring gear continuously connecting with an output shaft of the transmission and the fourth element connecting with an output shaft of a power plant;
a transmission housing;
an electric motor having an output shaft connecting with the first and fourth elements for driving the first and fourth elements in response to an electrical signal to obtain a desired transmission ratio;
non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio;
a non-friction first clutch assembly being non-hydraulically controlled to change between a coupling state for coupling the fourth element to the motor output shaft and an uncoupling state for uncoupling the fourth element from the motor output shaft;
a non-friction second clutch assembly being non-hydraulically controlled to change between a coupling state for coupling the first element to the motor output shaft and an uncoupling state for uncoupling the first element from the motor output shaft; and
a non-friction third clutch assembly being non-hydraulically controlled to change between a coupling state for coupling the fourth element to the power plant output shaft and an uncoupling state for uncoupling the fourth element from the power plant output shaft.

50. The system as claimed in claim 49 wherein the first, third and fourth elements comprise a first sun gear, a carrier and a second sun gear, respectively.

51. A vehicle drive system including a multi-speed transmission, the system comprising:
a power plant having an output shaft;
a compound planetary gear set including first, second, third and fourth elements, the second element comprising a ring gear continuously connecting with an output shaft of the transmission and the fourth element connecting with the power plant output shaft;
a transmission housing;
an electric motor having an output shaft connecting with the first and fourth elements for driving the first and fourth elements in response to an electrical signal;
non-friction controllable first and second brake assemblies, the first brake assembly having a coupling state for coupling the fourth element to the housing and an uncoupling state for uncoupling the fourth element from the housing, the second brake assembly having a coupling state for coupling the third element to the housing and an uncoupling state for uncoupling the third element from the housing, the first and second brake assemblies being non-hydraulically controlled to change state to maintain the desired transmission ratio;
a non-friction first clutch assembly being non-hydraulically controlled to change between a coupling state for coupling the fourth element to the motor output shaft and an uncoupling state for uncoupling the fourth element from the motor output shaft;
a non-friction second clutch assembly being non-hydraulically controlled to change between a coupling state for coupling the first element to the motor output shaft and an uncoupling state for uncoupling the first element from the motor output shaft;
a non-friction third clutch assembly being non-hydraulically controlled to change between a coupling state for coupling the fourth element to the power plant output shaft and an uncoupling state for uncoupling the fourth element from the power plant output shaft;
a non-friction fourth clutch assembly being non-hydraulically controlled to change between a coupling state for coupling the third element to an engine output shaft and an uncoupling state for uncoupling the third element from the engine output shaft.

52. The system as claimed in claim 51 wherein the first, third and fourth elements comprise a first sun gear, a carrier and a second sun gear, respectively.

53. The system as claimed in claim 51 wherein the electric motor and the power plant are mounted within the housing.

54. The system as claimed in claim 51 wherein the power plant comprises an electric motor.

* * * * *